United States Patent
Maeda et al.

(10) Patent No.: US 7,236,452 B2
(45) Date of Patent: Jun. 26, 2007

(54) MULTI-CARRIER CDMA TRANSMISSION SYSTEM, TRANSMITTING APPARATUS AND RECEIVING APPARATUS USED IN THIS SYSTEM, AND MULTI-CARRIER CDMA TRANSMISSION METHOD

(75) Inventors: Noriyuki Maeda, Yokohama (JP); Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1078 days.

(21) Appl. No.: 10/229,086

(22) Filed: Aug. 28, 2002

(65) Prior Publication Data

US 2003/0043733 A1 Mar. 6, 2003

(30) Foreign Application Priority Data

Aug. 28, 2001 (JP) ............................. 2001-258723

(51) Int. Cl.
*H04B 7/216* (2006.01)
(52) U.S. Cl. ..................... 370/210; 370/335; 370/465; 375/144
(58) Field of Classification Search ................ 370/210, 370/320, 330, 335, 342, 441, 465, 479; 375/130, 375/140–144, 146–148, 150, 152, 260, 267, 375/299, 343, 349
See application file for complete search history.

(56) References Cited

U.S. PATENT DOCUMENTS

| | | | | |
|---|---|---|---|---|
| 6,018,545 | A * | 1/2000 | Fukumasa et al. | 375/141 |
| 6,069,912 | A * | 5/2000 | Sawahashi et al. | 375/142 |
| 6,888,789 | B1 * | 5/2005 | Sakoda et al. | 370/208 |
| 2001/0022808 | A1 * | 9/2001 | Komatsu | 375/148 |

FOREIGN PATENT DOCUMENTS

| | | |
|---|---|---|
| JP | 2000-244445 | 9/2000 |
| JP | 2000-286819 | 10/2000 |
| JP | 2000-286821 | 10/2000 |
| JP | 2000-332723 | 11/2000 |
| JP | 2001-24618 | 1/2001 |

OTHER PUBLICATIONS

N. Yee, et al., IEEE Personal Indoor Mobile Radio Communications, pp. 109-113, "Multi-Carrier CDMA in Indoor Wireless Radio Networks", 1993.

(Continued)

*Primary Examiner*—Chi Pham
*Assistant Examiner*—Saba Tsegaye
(74) *Attorney, Agent, or Firm*—Oblon, Spivak, McClelland, Maier & Neustadt, P.C.

(57) ABSTRACT

Received signals of the respective sub-carriers are multiplied by a weighting controlled for each sub-carrier, using a weighting control part 2-8 and multipliers 2-9, so that the mean square error between the signals following despreading and the signals that are actually transmitted is minimized. Afterward, MMSE combining is performed.

36 Claims, 24 Drawing Sheets

OTHER PUBLICATIONS

S. Hara, et al., IEEE Transactions on Vehicular Technology, vol. 48, No. 5, pp. 1584-1595, Design and Performance of Multicarrier CDMA System in Frequency-Selective Rayleigh Fading Channels, Sep. 1999.

S. Kaiser, IEEE Global Telecommunications Conference, pp. 2059-2063, "On the Performance of Different Detection Techniques for OFDM-CDMA in Fading Channels", 1995.

A. Chouly, et al., IEEE Global Telecommunications Conference, pp. 1723-1728, "Orthogonal Multicarrier Techniques Applied to Direct Sequence Spread Spectrum CDMA Systems", 1993.

S. Hara, et al., IEEE Communications Magazine, pp. 126-133, "Overview of Multicarrier CDMA", Dec. 1997.

S. Haykin, Prentice Hall, pp. 339 to 343, 365 to 372, 483 to 495 and 562 to 572, "Adaptive Filter Theory, Third Edition", 1996.

\* cited by examiner

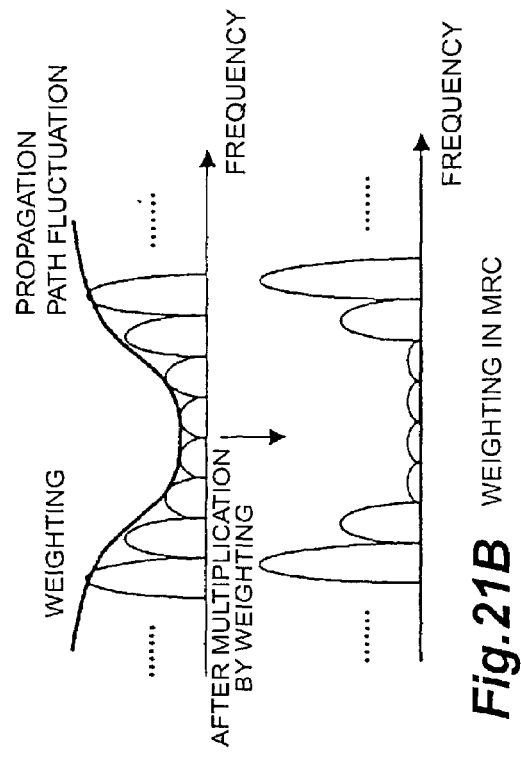
Fig.21A WEIGHTING IN ORC
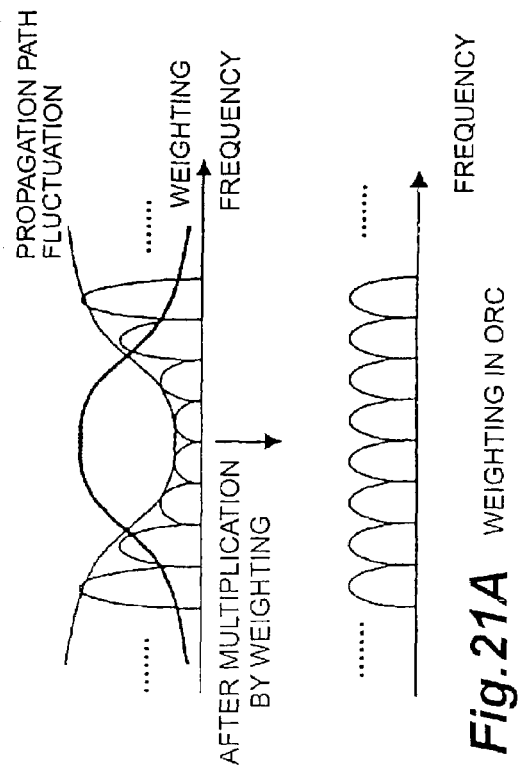
Fig.21C WEIGHTING IN EGC
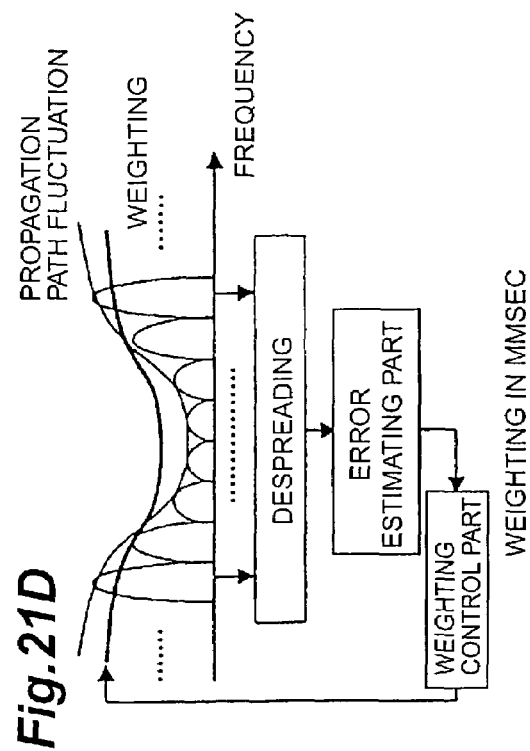
Fig.21B WEIGHTING IN MRC
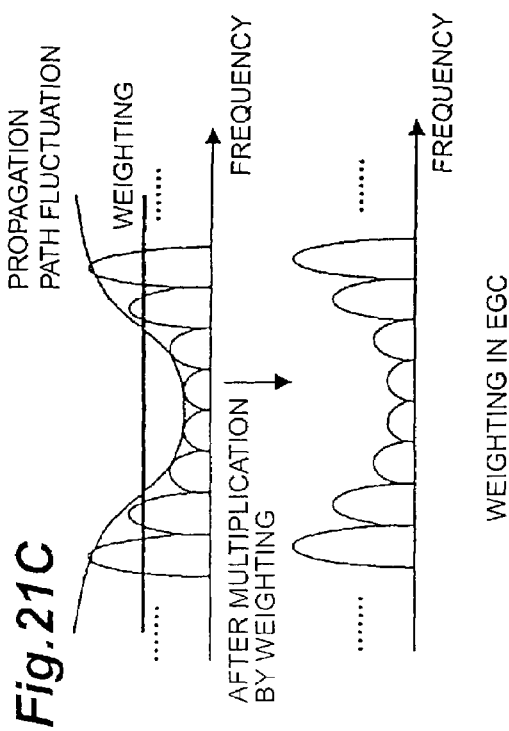
Fig.21D WEIGHTING IN MMSEC

MULTI-CARRIER CDMA TRANSMISSION SYSTEM, TRANSMITTING APPARATUS AND RECEIVING APPARATUS USED IN THIS SYSTEM, AND MULTI-CARRIER CDMA TRANSMISSION METHOD

BACKGROUND OF THE INVENTION

1. Field of the Invention

The present invention relates to a multi-carrier CDMA transmission system, a transmitting apparatus and receiving apparatus used in this system, and a multi-carrier CDMA transmission method, and more particularly relates to a multi-carrier CDMA transmission system in which the weighting of respective sub-carriers is controlled in accordance with fluctuations in the propagation path in order to compensate for the orthogonality between spreading codes that is destroyed by the effects of the propagation path, a transmitting apparatus and receiving apparatus used in this system, and a corresponding CDMA transmission method.

2. Description of the Related Art

A multi-carrier CDMA (code division multiple access) wireless transmission system was proposed in 1993 in "Multi-carrier CDMA in indoor wireless radio networks" (N. Yee et al., 1993 IEEE Personal Indoor Mobile Radio Communications); since then, the application of this system to digital mobile communications systems has been studied.

This system is a system in which information symbols are duplicated in the direction of the frequency axis, and the respective symbols are multiplied by respective single chips of a spreading code, after which the spread signals are transmitted in parallel by means of a plurality of sub-carriers with different frequencies. As a result, in this system, since multiplication by a spreading code is performed in the direction of the frequency axis, code multiplexing of a plurality of information channels can be realized by multiplying an orthogonal spreading code. Furthermore, since the symbol rate is reduced and the symbol length is expanded by performing parallel transmission using a plurality of sub-carriers, it is possible to reduce so-called "multi-path interference". This multi-path interference refers to a deterioration in characteristics that occurs as a result of transmitted signals arriving at the receiving part at different times via a plurality of different propagation paths (multi-path propagation paths) so that the signals interfere with each other, which is a problem in mobile communication environments.

Furthermore, in the case of the abovementioned multi-path propagation paths, frequency-selective fading occurs in which the fluctuation in the propagation path varies according to the frequency, so that the signal transmission quality varies according to the frequency. In the case of multi-carrier CDMA, however, since the signals are spread in the direction of the frequency axis, the signal transmission quality can be improved by the frequency diversity effect.

Meanwhile, as is shown in FIGS. 20(a) and 20(b), the received signals in a multi-carrier CDMA transmission system are multiplied in the frequency direction by the same code as the spreading code by which the signals were multiplied on the transmission side, so that the signals are subjected to despreading by combining the received signals of the respective sub-carriers across the spreading code period. As is shown in FIG. 20(a), in a case where the propagation path fluctuation of the respective sub-carriers is constant, the spreading codes that are totaled in the respective information channels are orthogonal to each other; accordingly, following despreading, the signals of the respective information channels can be completely restored.

However, in the signals that are received after being propagated over the multi-path propagation paths, as is shown in FIG. 20(b), the respective sub-carriers are subjected to different amplitude and phase fluctuations, so that the orthogonality between the spreading codes is destroyed, and the signals of other information channels interfere and remain in the signals following despreading. As a result, the signal transmission characteristics deteriorate. Accordingly, a method has been proposed in which the interference between information channels is reduced by a combining process in which the received signals of the respective sub-carriers are multiplied by weight.

As is shown in FIG. 21(a), ORC is a method in which the reciprocals of the propagation path fluctuation values are used as weights. Since the propagation path fluctuations of the signals following multiplication by these weights is constant, the orthogonality between the spreading codes is completely preserved. However, in the case of sub-carriers in which the amplitude value of the propagation path fluctuation is small, noise included in the received signals is amplified as a result of multiplication by large weights, so that the signal power/noise power ratio (SNR) following despreading is small, thus causing a deterioration in the signal transmission characteristics. As is shown in FIG. 21(b), MRC is a method in which the propagation path fluctuation values are used as weights. Here, sub-carriers with a small SNR are multiplied by small weights, and sub-carriers with a large SNR are multiplied by large weights, so that the SNR following despreading is maximized; however, the orthogonality between the spreading codes is destroyed to a great extent, so that interference is generated between the information channels.

As is shown in FIG. 21(c), EGC is a method in which all of the sub-carriers are multiplied by equal weights regardless of the propagation path fluctuation. This method gives consideration both to the improvement of the SNR following despreading, and to preserving the orthogonality between the spreading codes; however, since the propagation path fluctuation and number of multiplexed information channels vary from instant to instant in a mobile communication environment, optimal values are not always obtained in such an environment.

As is shown in FIG. 21(d), MMSEC is a method using weights which are such that the mean square error between the signals following despreading and the signals that are actually transmitted is minimal, thus producing optimal values in which improvement of the SNR following despreading and compensation for the orthogonality between the spreading codes are given consideration in accordance with the propagation path conditions that fluctuate from instant to instant. Accordingly, it is indicated in Reference A that MMSEC is the method that shows the most favorable transmission characteristics. Furthermore, a method in which the optimal weighting is calculated using values such as the amplitude/phase fluctuation values of the individual sub-carriers, the noise power, the number of multiplexed information channels or the like is indicated in Reference A (described below) as the weighting control method used in MMSEC.

SUMMARY OF THE INVENTION

However, in cases where the weighting for MMSE (minimum mean square error) combining is calculated using values such as the propagation path fluctuation values of the individual sub-carriers, the noise power, the number of multiplexed information channels or the like, these values must be appropriately estimated on the receiving side in order to determine the optimal weighting.

Furthermore, as is shown in FIG. 21(d), in cases where a method that successively updates the weighting using an adaptive algorithm is used, it is necessary to estimate (in the mean square error estimating part) the error between the signals following despreading and the signals (reference signals) that are actually transmitted. Accordingly, pilot signals in which the amplitude, phase, pattern and the like are known must be transmitted as reference signals from the transmitting side to the receiving side.

Accordingly, it is an object of the present invention to provide a method for appropriately estimating values such as the propagation path fluctuation values, noise power, number of multiplexed information channels or the like in order to realize weighting control used in MMSEC, as well as the construction required for this purpose, and also to provide a construction for multiplexing and transmitting, in an information signal interval that is short in terms of time (as in packet transmission), pilot signals that are required for the estimation of error information in an adaptive algorithm, a multi-carrier CDMA transmission system which can successively and efficiently update the weighting using limited pilot signals, a transmitting apparatus and receiving apparatus used in this system, and a CDMA transmission method used in this system.

The multi-carrier CDMA transmission system of the present invention is a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein weighting control means for controlling the weighting of each sub-carrier on the basis of the effects of the propagation path fluctuations estimated by the effect estimating means so that the signals following despreading approach the signals that are actually transmitted, and combining means for performing combining by multiplying the received signals of the respective sub-carriers by the weighting for each sub-carrier controlled by the weighting control means, are disposed on the receiving side.

Furthermore, the multi-carrier CDMA transmission system of the present invention is a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein effect estimating means for estimating the effects of the propagation path fluctuations to which the signals that are actually transmitted are subjected while these signals travel to the receiving side from the transmitting side, weighting control means for controlling the weighting of each sub-carrier on the basis of the effects of the propagation path fluctuations estimated by the effect estimating means so that the signals following despreading approach the signals that are actually transmitted, and combining means for performing combining by multiplying the received signals of the respective sub-carriers by the weighting for each sub-carrier controlled by the weighting control means, are disposed on the receiving side.

Furthermore, the multi-carrier transmission system of the present invention is a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein effect estimating means for estimating the effects of the propagation path fluctuations to which the signals that are actually transmitted are subjected while these signals travel to the receiving side from the transmitting side, error estimating means for estimating the error between the signals that are actually transmitted and the signals following despreading on the basis of signals used for the estimation of this error, weighting control means for controlling the weighting of each sub-carrier on the basis of the effects of the propagation path fluctuations estimated by the effect estimating means and the error estimated by the error estimating means so that the signals following despreading approach the signals that are actually transmitted, and combining means for performing combining by multiplying the received signals of the respective sub-carriers by the weighting for each sub-carrier controlled by the weighting control means, are disposed on the receiving side.

Furthermore, the multi-carrier transmission system of the present invention is a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein error estimating means for estimating the error between the signals that are actually transmitted and the signals following despreading on the basis of signals used for the estimation of this error, weighting control means for controlling the weighting of each sub-carrier on the basis of the error estimated by the error estimating means so that the signals following despreading approach the signals that are actually transmitted, and combining means for performing combining by multiplying the received signals of the respective sub-carriers by the weighting for each sub-carrier controlled by the weighting control means, are disposed on the receiving side.

Furthermore, the multi-carrier CDMA transmission system of the present invention is a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein combining means for performing MMSE combining by multiplying the received signals of the respective sub-carriers by weighting controlled for each sub-carrier so that the mean square error between the signals following despreading and the signals that are actually transmitted is minimized are disposed on the receiving side.

Furthermore, in the multi-carrier CDMA transmission system of the present invention, it is also desirable that the effect estimating means estimate the effects of propagation path fluctuations using pilot signals that are used to estimate propagation path information for each sub-carrier, or information relating to the number of multiplexed information channels, or both.

Furthermore, in the multi-carrier CDMA transmission system of the present invention, it is also desirable that the weighting used in MMSE combining be successively updated on the receiving side by an adaptive algorithm using at least one type of signal selected from a set consisting of pilot signals, the number of multiplexed information channels, and pilot signals utilized as reference signals.

Furthermore, in the multi-carrier CDMA transmission system of the present invention, it is also desirable that the effect estimating means estimate the propagation path fluctuation values, noise power and number of multiplexed channels as effects of propagation path fluctuations utilizing the signals following despreading and pilot signals used to estimate propagation path information for each sub-carrier.

Furthermore, in the multi-carrier CDMA transmission system of the present invention, it is also desirable that the weighting of the abovementioned MMSE combining be successively updated by an adaptive algorithm utilizing pilot signals that are used for successive updating of the weighting used in MMSE combining, so that the mean square error between the signals following despreading and the signals that are actually transmitted is minimized.

Furthermore, in the multi-carrier CDMA transmission system of the present invention, it is also desirable that the effect estimating means estimate the propagation path fluctuation values and noise power as effects of propagation path fluctuations, with this estimation being performed utilizing the signals following despreading and pilot signals that are used to estimate propagation path information for each sub-carrier, and that the effect estimating means estimate the number of multiplexed information channels as an effect of propagation path fluctuations, with this estimation being performed utilizing information relating to the number of multiplexed information channels.

Furthermore, in the multi-carrier CDMA transmission system of the present invention, it is also desirable that the propagation path fluctuation values and noise power be estimated on the receiving side using information signals and pilot signals that are used to estimate propagation path information, that the number of information channels be estimated using information relating to the number of multiplexed information channels, and that the weighting for MMSE combining be calculated using these estimated values.

Furthermore, in the multi-carrier CDMA transmission system of the present invention, it is also desirable that the error estimating means estimate the error using at least one type of signal selected from a set consisting of pilot signals used for the successive updating of the weighting, pilot signals utilized as reference signals, pilot signals in which the amount of fluctuation is averaged in the direction of the frequency axis, and pilot signals in which the amount of fluctuation is averaged in the direction of the time axis, as signals for estimating the error relative to the signals following despreading.

Furthermore, in the multi-carrier CDMA transmission system of the present invention, it is also desirable that the weighting used for MMSE combining be successively updated using pilot signals in which the amount of fluctuation is averaged in the direction of the frequency axis in cases where the weighting used for the abovementioned MMSE combining is successively updated by means of an adaptive algorithm.

Furthermore, in the multi-carrier CDMA transmission system of the present invention, it is also desirable that the weighting used for MMSE combining be successively updated using pilot signals in which the amount of fluctuation is averaged in the direction of the time axis in cases where the weighting used for the MMSE combining is successively updated by means of an adaptive algorithm.

Furthermore, in the multi-carrier CDMA transmission system of the present invention, it is also desirable that the weighting control means successively update the weighting for each sub-carrier by means of an adaptive algorithm so that the signals following despreading approach the signals that are actually transmitted.

Furthermore, in the multi-carrier CDMA transmission system of the present invention, it is it is also desirable that the weighting control means successively update the weighting for each sub-carrier by means of an adaptive algorithm so that the signals prior to the reception FFT treatment approach the signals that are actually transmitted.

Furthermore, in the multi-carrier CDMA transmission system of the present invention, it is also desirable that the weighting of the MMSE combining be successively updated by means of an adaptive algorithm utilizing pilot signals that are used for the successive updating of the weighting used in MMSE combining, so that the mean square error between the signals prior to the reception FFT treatment and the signals that are actually transmitted is minimized.

Furthermore, in the multi-carrier CDMA transmission system of the present invention, it is also desirable that the weighting control means determine the initial values of the weighting for each sub-carrier on the basis of the effects of the propagation path fluctuations estimated by the effect estimating means, and that the weighting control means successively update the weighting for each sub-carrier by means of an adaptive algorithm on the basis of the error estimated by the error estimating means.

Furthermore, in the multi-carrier CDMA transmission system of the present invention, it is also desirable that the initial values of the weighting used for MMSE combining be determined on the basis of propagation path information estimated from pilot signals used to estimate propagation path information, and that the weighting be successively updated by means of an adaptive algorithm on the basis of pilot signals used for the successive updating of the weighting.

Furthermore, in the multi-carrier CDMA transmission system of the present invention, it is also desirable that weighting information transmitting means for transmitting, separately from the signals that are actually transmitted, at least one type of signal selected from a set consisting of pilot signals used to estimate propagation path information for each sub-carrier, information relating to the number of multiplexed information channels, pilot signals utilized as reference signals, pilot signals used for the successive updating of the weighting, pilot signals used on the receiving side for averaging the amount of fluctuation in the direction of the frequency axis, and pilot signals used on the receiving side for averaging the amount of fluctuation in the direction of the time axis, be disposed on the transmitting side.

Furthermore, in the multi-carrier CDMA transmission system of the present invention, it is also desirable that means for transmitting, separately from the information signals, at least one type of signal selected from a set consisting of known pilot signals used to estimate propagation path information for each sub-carrier, the number of multiplexed information channels, and pilot signals utilized as reference signals, be disposed on the transmitting side, and that means for controlling by means of these signals the weighting that is used in MMSE combining be disposed on the receiving side.

The transmitting apparatus of the present invention is a transmitting apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this transmitting apparatus includes weighting information transmitting means for transmitting, separately from the signals that are actually transmitted, at least one type of signal selected from a set consisting of pilot signals used to estimate propagation path information for each sub-carrier, information relating to the number of multiplexed information channels, pilot signals utilized as reference signals, pilot signals used for the successive updating of the weighting, pilot signals used on the receiving side for averaging the amount of fluctuation in the direction of the frequency axis, and pilot signals used on the receiving side for averaging the amount of fluctuation in the direction of the time axis Furthermore, the transmitting apparatus of the present invention is a transmitting apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein, for the purpose of controlling the weighting used for MMSE combining, this transmitting apparatus includes means for transmitting, separately from the information signals, at least one type of signal selected from a set consisting of known pilot signals used to estimate propagation path information for each sub-carrier, the number of multiplexed information channels, and pilot signals utilized as reference signals.

The receiving apparatus of the present invention is a receiving apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this receiving apparatus includes weighting control means for controlling the weighting for each sub-carrier so that the signals following despreading approach the signals that are actually transmitted, and combining means for performing combining by multiplying the received signals for each sub-carrier by the weighting for each sub-carrier controlled by the weighting control means.

Furthermore, the receiving apparatus of the present invention is a receiving apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this receiving apparatus includes effect estimating means for estimating the effects of the propagation path fluctuations to which the signals that are actually transmitted are subjected while these signals travel to the receiving side from the transmitting side, weighting control means for controlling the weighting of each sub-carrier on the basis of the effects of the propagation path fluctuations estimated by the effect estimating means so that the signals following despreading approach the signals that are actually transmitted, and combining means for performing combining by multiplying the received signals of the respective sub-carriers by the weighting for each sub-carrier controlled by the weighting control means.

Furthermore, the receiving apparatus of the present invention is a receiving apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this receiving apparatus includes effect estimating means for estimating the effects of the propagation path fluctuations to which the signals that are actually transmitted are subjected while these signals travel to the receiving side from the transmitting side, error estimating means for estimating the error between the signals that are actually transmitted and the signals following despreading on the basis of signals used for the estimation of this error, weighting control means for controlling the weighting of each sub-carrier on the basis of the effects of the propagation path fluctuations estimated by the effect estimating means and the error estimated by the error estimating means so that the signals following despreading approach the signals that are actually transmitted, and combining means for performing combining by multiplying the received signals of the respective sub-carriers by the weighting for each sub-carrier controlled by the weighting control means.

Furthermore, the receiving apparatus of the present invention is a receiving apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this receiving apparatus includes error estimating means for estimating the error between the signals that are actually transmitted and the signals following despreading on the basis of signals used for the estimation of this error, weighting control means for controlling the weighting of each sub-carrier on the basis of the error estimated by the error estimating means so that the signals following despreading approach the signals that are actually transmitted, and combining means for performing combining by multiplying the received signals of the respective sub-carriers by the weighting for each sub-carrier controlled by the weighting control means.

Furthermore, the receiving apparatus of the present invention is a receiving apparatus in a multi-carrier CDMA transmission system in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this receiving apparatus includes combining means for performing MMSE combining by multiplying the received signals of the respective sub-carriers by weighting controlled for each sub-carrier so that the mean square error between the signals following despreading and the signals that are actually transmitted is minimized.

Furthermore, in the receiving apparatus of the present invention, it is also desirable that the effect estimating means estimate the effects of propagation path fluctuations using pilot signals that are used to estimate propagation path information for each sub-carrier, or information relating to the number of multiplexed information channels, or both.

Furthermore, in the receiving apparatus of the present invention, it is also desirable that the effect estimating means estimate the propagation path fluctuation values, noise power and number of multiplexed channels as the effects of propagation path fluctuations utilizing the signals following despreading and pilot signals that are used to estimate propagation path information for each sub-carrier.

Furthermore, in the receiving apparatus of the present invention, it is also desirable that the propagation path fluctuation values, noise power and number of multiplexed information channels be estimated utilizing information signals and pilot signals that are used to estimate propagation path information, and that the weighting used for the abovementioned MMSE combining be calculated using these estimated values.

Furthermore, in the receiving apparatus of the present invention, it is also desirable that the effect estimating means estimate the propagation path fluctuation values and noise power as effects of propagation path fluctuations, with this estimation being performed utilizing the signals following despreading and pilot signals used to estimate propagation path information for each sub-carrier, and that the effect estimating means estimate the number of multiplexed information channels as an effect of propagation path fluctuations, with this estimation being performed utilizing information relating to the number of multiplexed information channels.

Furthermore, in the receiving apparatus of the present invention, it is also desirable that the propagation path fluctuation values and noise power be estimated using information signals and pilot signals that are used to estimate propagation path information, that the number of information channels be estimated using information relating to the number of multiplexed information channels, and that the weighting for MMSE combining be calculated using these estimated values.

Furthermore, in the receiving apparatus of the present invention, it is also desirable that the error estimating means estimate the error using at least one type of signal selected from a set consisting of pilot signals used for the successive updating of the weighting, pilot signals utilized as reference signals, pilot signals in which the amount of fluctuation is averaged in the direction of the frequency axis, and pilot signals in which the amount of fluctuation is averaged in the direction of the time axis, as signals for estimating the error relative to the signals following despreading.

Furthermore, in the receiving apparatus of the present invention, it is also desirable that the weighting of the abovementioned MMSE combining be successively updated by an adaptive algorithm utilizing pilot signals that are used for successive updating of the weighting used in MMSE combining, so that the mean square error between the signals following despreading and the signals that are actually transmitted is minimized.

Furthermore, in the receiving apparatus of the present invention, it is also desirable that the weighting used for MMSE combining be successively updated using pilot signals in which the amount of fluctuation is averaged in the direction of the frequency axis in cases where the weighting used for the MMSE combining is successively updated by means of an adaptive algorithm.

Furthermore, in the receiving apparatus of the present invention, it is also desirable that the weighting used for MMSE combining be successively updated using pilot signals in which the amount of fluctuation is averaged in the direction of the time axis in cases where the weighting used for the MMSE combining is successively updated by means of an adaptive algorithm.

Furthermore, in the receiving apparatus of the present invention, it is also desirable that the weighting control means successively update the weighting for each sub-carrier by means of an adaptive algorithm so that the signals following despreading approach the signals that are actually transmitted.

Furthermore, in the receiving apparatus of the present invention, it is also desirable that the weighting control means successively update the weighting for each sub-carrier by means of an adaptive algorithm so that the signals prior to the reception FFT treatment approach the signals that are actually transmitted.

Furthermore, in the receiving apparatus of the present invention, it is also desirable that the weighting of the MMSE combining be successively updated by means of an adaptive algorithm utilizing pilot signals that are used for the successive updating of the weighting used in MMSE combining, so that the mean square error between the signals prior to the reception FFT treatment and the signals that are actually transmitted is minimized.

Furthermore, in the receiving apparatus of the present invention, it is also desirable that the weighting control means determine the initial values of the weighting for each sub-carrier on the basis of the effects of the propagation path fluctuations estimated by the effect estimating means, and that the weighting control means successively update the weighting for each sub-carrier by means of an adaptive algorithm on the basis of the error estimated by the error estimating means.

Furthermore, in the receiving apparatus of the present invention, it is also desirable that the initial values of the weighting used for MMSE combining be determined on the basis of propagation path information estimated from pilot signals used to estimate propagation path information, and that the weighting be successively updated by means of an adaptive algorithm on the basis of pilot signals used for the successive updating of the weighting.

The multi-channel CDMA transmission method of the present invention is a multi-channel CDMA transmission method in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this method comprises a step in which weighting control means on the receiving side control the weighting for each sub-carrier so that the signals following despreading approach the signals that are actually transmitted, and a step in which combining means on the receiving side perform combining by multiplying the received signals of each sub-carrier by the weighting for each sub-carrier controlled by the weighting control means.

Furthermore, the multi-channel CDMA transmission method of the present invention is a multi-channel CDMA transmission method in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this method comprises a step in which effect estimating means on the receiving side estimate the effects of the propagation path fluctuations to which the signals that are actually transmitted are subjected while these signals travel to the receiving side from the transmitting side, a step in which weighting control means on the receiving side control the weighting for each sub-carrier on the basis of the effects of the propagation path fluctuations estimated by the effect estimating means so that the signals following despreading approach the signals that are actually transmitted, and a step in which combining means on the receiving side perform combining by multiplying the received signals of each sub-carrier by the weighting for each sub-carrier controlled by the weighting control means.

Furthermore, the multi-channel CDMA transmission method of the present invention is a multi-channel CDMA transmission method in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this method comprises a step in which effect estimating means on the receiving side estimate the effects of the propagation path fluctuations to which the signals that are actually transmitted are subjected while these signals travel to the receiving side from the transmitting side, a step in which error estimating means on the receiving side estimate the error between the signals that are actually transmitted and the signals following despreading on the basis of signals used for the estimation of this error, a step in which weighting control means on the receiving side control the weighting for each sub-carrier on the basis of the effects of the propagation path estimated by the effect estimating means and the error estimated by the error estimating means so that the signals following despreading approach the signals that are actually transmitted, and a step in which combining means on the receiving side perform combining by multiplying the received signals of each sub-carrier by the weighting for each sub-carrier controlled by the weighting control means.

Furthermore, the multi-channel CDMA transmission method of the present invention is a multi-channel CDMA transmission method in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein this method comprises a step in which error estimating means on the receiving side estimate the error between the signals that are actually transmitted and the signals following despreading on the basis of signals used for the estimation of this error, a step in which weighting control means on the receiving side control the weighting for each sub-carrier on the basis of the error estimated by the error estimating means so that the signals following despreading approach the signals that are actually transmitted, and a step in which combining means on the receiving side perform combining by multiplying the received signals of each sub-carrier by the weighting for each sub-carrier controlled by the weighting control means.

Furthermore, in the multi-channel CDMA transmission method of the present invention, it is also desirable that the effect estimating means estimate the effects of propagation path fluctuations using pilot signals that are used to estimate propagation path information for each sub-carrier, or information relating to the number of multiplexed information channels, or both, in the step in which the abovementioned effects are estimated.

Furthermore, in the multi-channel CDMA transmission method of the present invention, it is also desirable that the effect estimating means estimate the propagation path fluctuation values, noise power and number of multiplexed channels as effects of propagation path fluctuations utilizing the signals following despreading and pilot signals used to estimate propagation path information for each sub-carrier in the step in which the effects are estimated.

Furthermore, in the multi-channel CDMA transmission method of the present invention, it is also desirable that the effect estimating means estimate the propagation path fluctuation values and noise power as effects of propagation path fluctuations, with this estimation being performed utilizing the signals following despreading and pilot signals that are used to estimate propagation path information for each sub-carrier, and that the effect estimating means estimate the number of multiplexed information channels as an effect of propagation path fluctuations, with this estimation being performed utilizing information relating to the number of multiplexed information channels, in the step in which the abovementioned effects are estimated.

Furthermore, in the multi-channel CDMA transmission method of the present invention, it is also desirable that the error estimating means estimate the error using at least one type of signal selected from a set consisting of pilot signals used for the successive updating of the weighting, pilot signals utilized as reference signals, pilot signals in which the amount of fluctuation is averaged in the direction of the frequency axis, and pilot signals in which the amount of fluctuation is averaged in the direction of the time axis, as signals for estimating the error relative to the signals following despreading in the step in which the error is estimated.

Furthermore, in the multi-channel CDMA transmission method of the present invention, it is also desirable that the weighting control means successively update the weighting for each sub-carrier by means of an adaptive algorithm in the step in which the weighting is controlled, so that that the signals following despreading approach the signals that are actually transmitted.

Furthermore, in the multi-channel CDMA transmission method of the present invention, it is also desirable that the weighting control means successively update the weighting for each sub-carrier by means of an adaptive algorithm in the step in which the weighting is controlled, so that that the signals prior to the reception FFT treatment approach the signals that are actually transmitted.

Furthermore, in the multi-channel CDMA transmission method of the present invention, it is also desirable that the weighting control means determine the initial values of the weighting for each sub-carrier on the basis of the effects of the propagation path fluctuations estimated by the effect estimating means, and that the weighting control means successively update the weighting for each sub-carrier by means of an adaptive algorithm on the basis of the error estimated by the error estimating means, in the step in which the weighting is controlled.

Furthermore, in the multi-channel CDMA transmission method of the present invention, it is also desirable that the method include a step in which the weighting information transmitting means on the transmitting side transmits, separately from the signals that are actually transmitted, at least one type of signal selected from a set consisting of pilot signals used to estimate propagation path information for each sub-carrier, information relating to the number of multiplexed information channels, pilot signals utilized as reference signals, pilot signals used for the successive updating of the weighting, pilot signals used on the receiving side for averaging the amount of fluctuation in the direction of the frequency axis, and pilot signals used on the receiving side for averaging the amount of fluctuation in the direction of the time axis.

In short, in the present invention, a plurality of information channels can be multiplexed and transmitted by performing MMSE combining in which the received signals of the respective sub-carriers are multiplied by a weighting controlled for each sub-carrier so that the mean square error between the signals following despreading and the signals that are actually transmitted is minimized. Accordingly, in cases where the information channels are multiplexed by multiplying the channels by mutually orthogonal spreading codes in the frequency direction, the effects of the interference that is generated between the multiplexed information channels as a result of the orthogonality between the spreading codes being destroyed by the effects of the propagation path can be reduced.

In the present invention, as was described above, the weights by which the received signals of the respective sub-carriers are multiplied can be controlled to appropriate values in accordance with propagation path fluctuations so that the mean square error between the signals following despreading and the signals that are actually transmitted is minimized in a multi-carrier CDMA transmission method. Accordingly, the destruction of the orthogonality between the spreading codes can be compensated for while the noise amplitude following weighting multiplication is suppressed, so that an effect hat improves the signal transmission characteristics is obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 4 is a diagram which shows one example of the transmission format of pilot signals used to estimate propagation path fluctuation values or the like;

FIG. 6 is a diagram which shows one example of the transmission format of pilot signals used to estimate propagation path fluctuation values or the like;

FIG. 8 is a diagram which shows one example of the transmission format of pilot signals used to estimate propagation path fluctuation values or the like;

FIG. 21a is a diagram which shows the conditions of weighting in sub-carrier combining;

FIG. 21b is a diagram which shows the conditions of weighting in sub-carrier combining;

FIG. 21c is a diagram which shows the conditions of weighting in sub-carrier combining;

FIG. 21d is a diagram which shows the conditions of weighting in sub-carrier combining;

DESCRIPTION OF THE PREFERRED EMBODIMENTS

Figure 1:
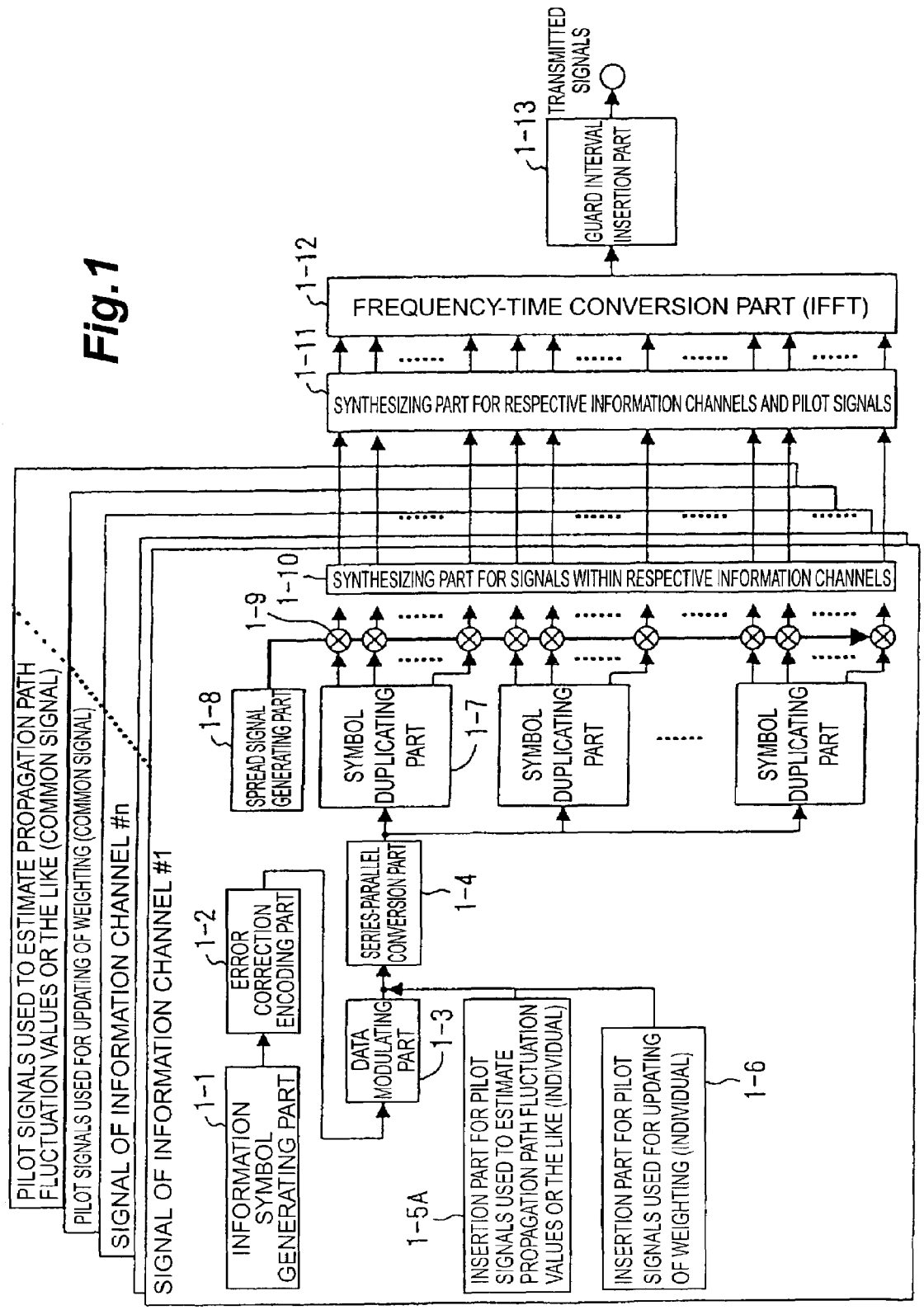
FIG. 1 is a diagram which shows an example of the construction of the transmitting apparatus of a multi-carrier CDMA transmission system constructed according to an embodiment of the present invention.

Next, embodiments of the present invention will be described with reference to the attached figures. Furthermore, in the respective figures referred to in the following description, parts that are the same as parts in other figures are labeled with the same symbols.

In the embodiments of the present invention, for example, the methods of ORC (orthogonality restoring combining), MRC (maximum ratio combining), EGC (equal gain combining) and MMSEC (minimum mean square error combining) in "Design and Performance of Multicarrier CDMA System in Frequency-Selective Rayleigh Fading Channels" (S. Hara et al., IEEE Transactions on Vehicular Technology, pp. 1584-1595, Vol. 48, No. 5, September 1999 (hereafter referred to as "Reference A") are indicated as control methods for the weighting by which the received signals of the respective sub-carriers are multiplied.

In past studies, e.g., in Reference A mentioned above, it has been considered that values such as the propagation path fluctuation values of the respective sub-carriers, the noise power, the number of multiplexed information channels and the like are known on the receiving side. Furthermore, in the paper titled "On the Performance of Different Detection Techniques for OFDM-CDMA in Fading Channels" (Stefan Kaiser, 1995 IEEE Global Telecommunications Conference), standard optimal values obtained by replacing the number of channels with the maximum number of channels that can be multiplexed or the like are used. Accordingly, there has been no investigation of methods for calculating an optimal weighting by actually estimating these values.

Furthermore, another method for controlling the weighting in MMSEC is (for example) a method in which the weighting is successively updated by means of an adaptive algorithm such as LMS (least mean square), RLS (recursive least squares) or the like, so that the weighting has an optimal value. For example, this is described in "Orthogonal multicarrier techniques applied to direct sequence CDMA systems" (A. Chouly et al., 1993 IEEE Global Telecommunications Conference) (hereafter referred to as "Reference B").

In past studies, e. g., in the Reference B, investigations have been performed assuming conditions that allow pilot signals with a length sufficient for the updating of the weighting to be obtained on the receiving side. There has been no investigation of methods in which updating is efficiently performed by multiplexing and transmitting pilot signals with information signals and separating these signals on the receiving side in cases where the signals are not continuous and communication is completed in a short time so that pilot signals sufficient for the updating of the weighting cannot be obtained, as in (for example) packet transmission.

Furthermore, references disclosing other combining techniques include "Overview of Multicarrier CDMA" (S. Hara and R. Prasad, December 1997 IEEE Communications Magazine, pp. 126-133); here, in addition to ORC, EGC, MRC and MMSEC, CE (controlled equalization), MLSE and techniques that combine respective combining methods are described.

Furthermore, references that disclose adaptive algorithm techniques include "Adaptive Filter Theory, Third Edition" (S. Haykin, 1996, PRENTICE HALL); here, in addition to typical adaptive algorithms (LMS, RLS), steepest descent algorithms, least squares algorithms and the like are also described.

The combining methods and adaptive algorithms described in the references can be appropriately used in the present embodiments.

FIG. 1 is a block diagram which shows one embodiment of the transmitting apparatus in the multi-carrier CDMA transmission system of the present invention. As is shown in this figure, the following transmitting apparatus is installed for each of the following types of signals: i. e., signals of information channels #1 through #n, which are the signals that are to be transmitted, pilot signals used for updating of the weighting, and pilot signals used to estimate propagation path fluctuation values or the like. Specifically, the transmitting apparatus is constructed so that this apparatus includes an information symbol generating part 1-1, an error correction encoding part 1-2, a data modulating part 1-3, a series-parallel conversion part 1-4, symbol duplicating parts 1-7, a spread signal generating part 1-8, an insertion part 1-5A for pilot signals used to estimate propagation path fluctuation values or the like, an insertion part 1-6 for pilot signals used to update the weighting, multipliers 1-9, and a combining part 1-10 for signals within the respective information channels. Furthermore, a combining part 1-11 for the respective information channels and pilot signals, a frequency-time conversions part (IFFT) 1-12 and a guard interval insertion part 1-13 are installed in common for the signals of the information channels #1 through #n, the pilot signals used to update the weighting, and the pilot signals used to estimate propagation path fluctuation values or the like. Moreover, the output of the guard interval insertion part 1-13 constitutes the transmitted signal.

In such a construction, information symbols that are generated by the information symbol generating part 1-1 corresponding to the respective information channels are subjected to a certain specified error correction encoding such as (for example) turbo encoding in the error correction encoding part 1-2 in order to allow error correction decoding on the side of the receiving apparatus. Furthermore, in the data modulating part 1-3, a specified data modulation such as (for example) QPSK (quadrature phase shift keying) modulation is performed. the information symbol sequences in which the data has been modulated are subjected to a series-parallel conversion in the series-parallel conversion part 1-4 in order to transmit a plurality of symbols simultaneously. The respective symbols that have been subjected to this series-parallel conversion are duplicated a number of times that is equal to the spreading period of the spreading code in a plurality of symbol duplicating parts 1-7. The respective duplicated symbols are multiplied by spread signals corresponding to the respective information channels in the multipliers 1-9. These spread signals are generated in the spread signal generating part 1-8. After the signals of the respective information channels have been multiplexed, the signals are converted by the frequency-time conversion part (IFFT) to produce multi-carrier CDMA signals, and the spread parallel-sequence signals are transmitted by the respective sub-carrier frequencies.

In the multi-carrier CDMA signals that are actually transmitted, guard intervals are inserted for each symbol in order to reduce the effects of interference between symbols in signals that arrive on the side of the receiving apparatus after being delayed by the effects of multi-path propagation.

In the transmitting apparatus of such a multi-carrier CDMA transmission method, as one embodiment in the present invention, a construction in which pilot signals used to estimate propagation path fluctuation values or the like are inserted into the information signals is shown in FIG. 1 as the construction that is necessary in order to estimate the propagation path fluctuation values or the like that are utilized to calculate the weighting for each sub-carrier. The pilot signals used to estimate propagation path fluctuation values or the like are signals in which the amplitude, phase, pattern and the like are known on the side of the receiving apparatus. Using these signals, the receiving apparatus can estimate the values of the propagation path fluctuations or the like to which the transmitted signals are subjected on the propagation path. Furthermore, the pilot signals used to estimate propagation path fluctuation values or the like may have a construction in which individual pilot signals are inserted into each information channel, or may have a construction in which a common pilot signal is inserted into all of the information channels. This embodiment will be described in greater detail later.

Furthermore, in FIG. 1, as one example of an embodiment in the present invention, a construction in which pilot signals used to update the weighting are inserted into the information signals is indicated as the construction that is necessary in order to perform successive updating of the weighting by means of an adaptive algorithm. The pilot signals used to update the weighting are signals in which the amplitude, phase, pattern and the like are known on the side of the receiving apparatus. Using these signals, the receiving apparatus can estimate the error between the signals following despreading and the signals that are actually transmitted, and can successively update the weighting for each sub-carrier by means of an adaptive algorithm. Furthermore, the pilot signals used to update the weighting may have a construction in which individual pilot signals are inserted into each information channel, or a construction in which a common pilot signal is inserted into all of the information channels. This embodiment will be described in greater detail later.

Figure 2:
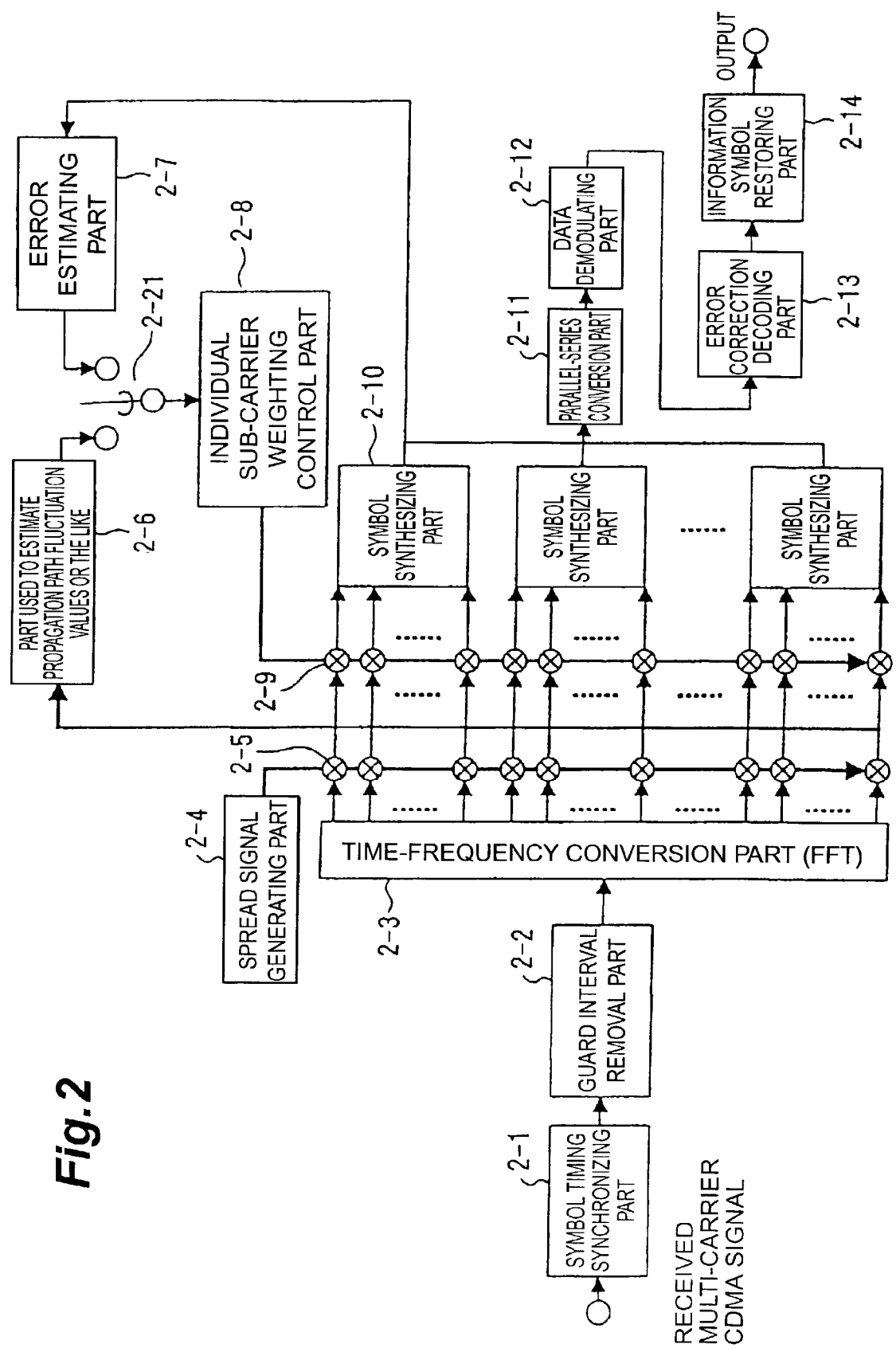
FIG. 2 is a diagram which shows an example of the construction of the receiving apparatus of a multi-carrier CDMA transmission system constructed according to an embodiment of the present invention.

One example of the construction of the receiving apparatus in an embodiment of the multi-carrier CDMA transmission system of the present invention is shown in FIG. 2.

In FIG. 2, the receiving apparatus is constructed so that this apparatus includes a symbol timing synchronizing part 2-1, a guard interval removal part 2-2, a time-frequency conversion part (FFT) 2-3, a spread signal generating part 2-4, multipliers 2-5, a part for estimating propagation path fluctuation values or the like (effect estimating means) 2-6, an error estimating part (error estimating means) 2-7, a part for controlling the weighting of each sub-carrier (weighting control means) 2-8, multipliers 2-9, a symbol combining part 2-10, a parallel-series conversion part 2-11, a data demodulating part 2-12, an error correction decoding part 2-13, and an information symbol restoring part 2-14.

On the side of the receiving apparatus constructed as described above, after the synchronization of the symbol timing has been established by the symbol timing synchronizing part 2-1, the guard intervals are removed by the guard interval removal part 2-2, and the signals are separated into respective sub-carrier frequency components by the time-frequency conversion part 2-3. Then, in the same manner as in the abovementioned transmitting apparatus, spread signals corresponding to the respective information channels are multiplied by the multipliers 2-5 on the frequency axis. These spread signals are generated by the spread signal generating part 2-4. Furthermore, a weighting which is controlled so that the mean square error between the signals following despreading and the signal that are actually transmitted is minimized is multiplied by the multipliers 2-9, and combining is performed across the spreading period in the symbol combining part 2-10, so that the signals prior to spreading are restored. The restored signals are subjected to parallel-series conversion by the parallel-series conversion part 2-11, and are then subjected to data demodulation by the data demodulating part 2-12 and error correction decoding by the error correction decoding part 2-13, and the transmitted information signals are restored in the information symbol restoring part 2-14.

Furthermore, the output of the part 2-6 for estimating the propagation path fluctuation values or the like and the output of the error estimating part 2-7 are switched by the weighting control part 2-8 for each sub-carrier, thus producing the weighting that is multiplied in the multipliers 2-9.

Furthermore, as an example of one embodiment of the present invention, a construction in which the weighting for each sub-carrier is calculated in the weighting control part using the propagation path fluctuation values or the like estimated by the part used to estimate propagation path fluctuation values or the like, and a construction in which the error between the signals following despreading and the signals that are actually transmitted is estimated in the error estimating part, and the weighting is successively updated by means of an adaptive algorithm in the weighting control part, are shown in FIG. 2.

Figure 3:
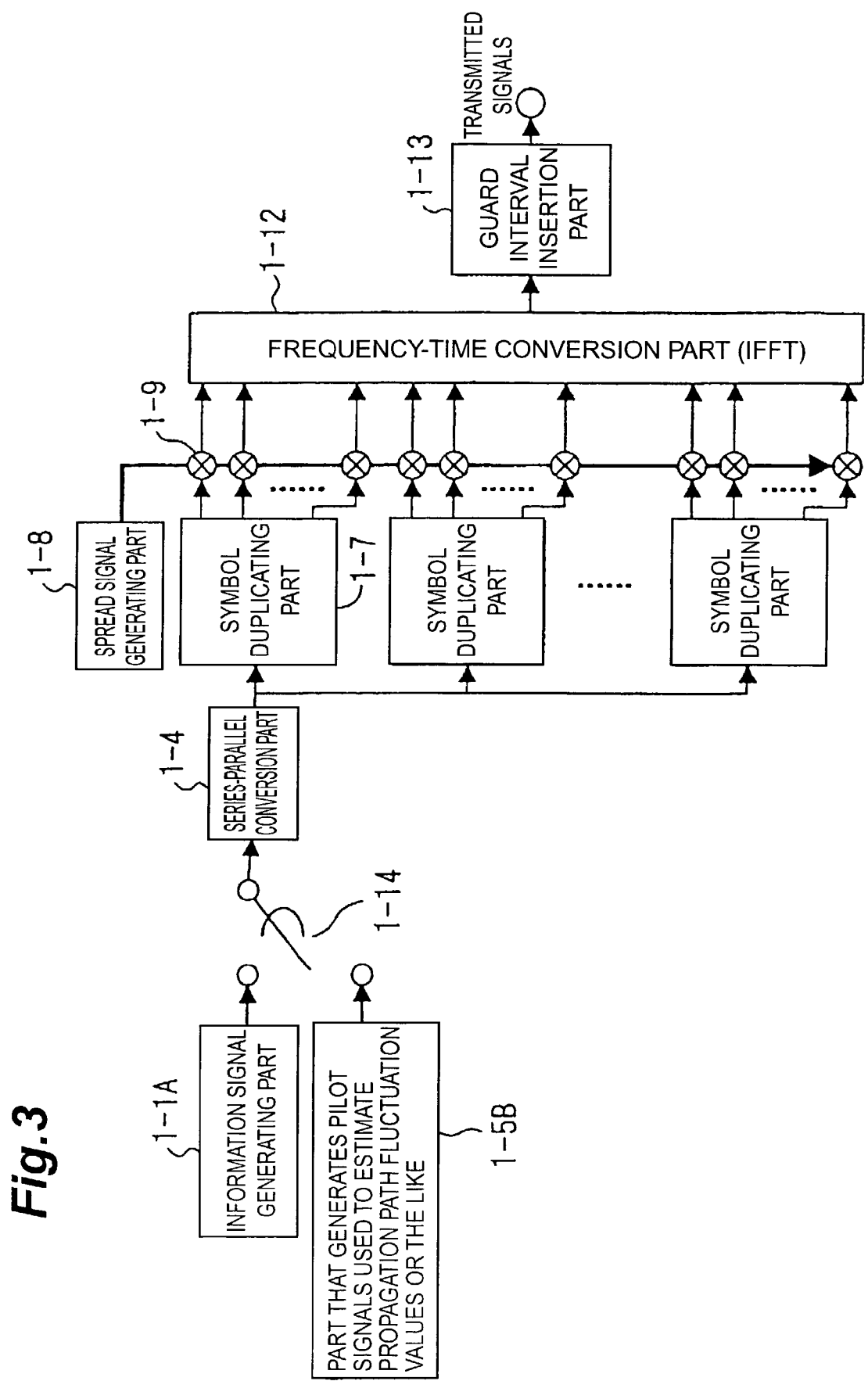
FIG. 3 is a block diagram which shows a construction used to estimate propagation path fluctuation values or the like in the transmitting apparatus.

As one example of an embodiment in the present invention, a portion of a construction in which pilot signals used to estimate information such as the propagation path fluctuation values or the like for each sub-carrier are transmitted separately from the information signals in order to control the weighting used in MMSE combining utilizing information such as the estimated values of the propagation path fluctuation or the like is shown in FIG. 3.

In this figure, the transmitting apparatus is constructed so that this apparatus includes an information signal generating part 1-1A, a series-parallel conversion part 1-4, symbol duplicating parts 1-7, a spread signal generating part 1-8, an insertion part 1-5A for pilot signals used to estimate propagation path fluctuation values or the like, an insertion part 1-6 for pilot signals used to update the weighting, multipliers 1-9, a frequency-time conversion part (IFFT) 1-12, and a guard interval insertion part 1-13. Furthermore, the transmitting apparatus is constructed so that this apparatus includes apart 1-5B that generates pilot signals used to estimate propagation path fluctuation values or the like, and a switching device 1-14 which is used to switch between the output of the information signal generating part 1-1A and the output of the part 1-5B that generates pilot signals used to estimate propagation path fluctuation values or the like, in order to input these outputs into the series-parallel conversion part 1-4.

In this embodiment, the data-modulated information signals and pilot signals are converted into multi-carrier CDMA signals by the same procedure, i.e., by series-parallel conversion by the series-parallel conversion part 1-4, duplication in the direction of the frequency axis by the symbol duplicating parts 1-7, multiplication of the spread signals in the direction of the frequency axis by the multipliers 1-9 and the like, and frequency-time conversion by the frequency-time conversion part 1-12. Furthermore, the pilot signals may be transmitted in a different signal format from that of the information signals.

Figure 4:
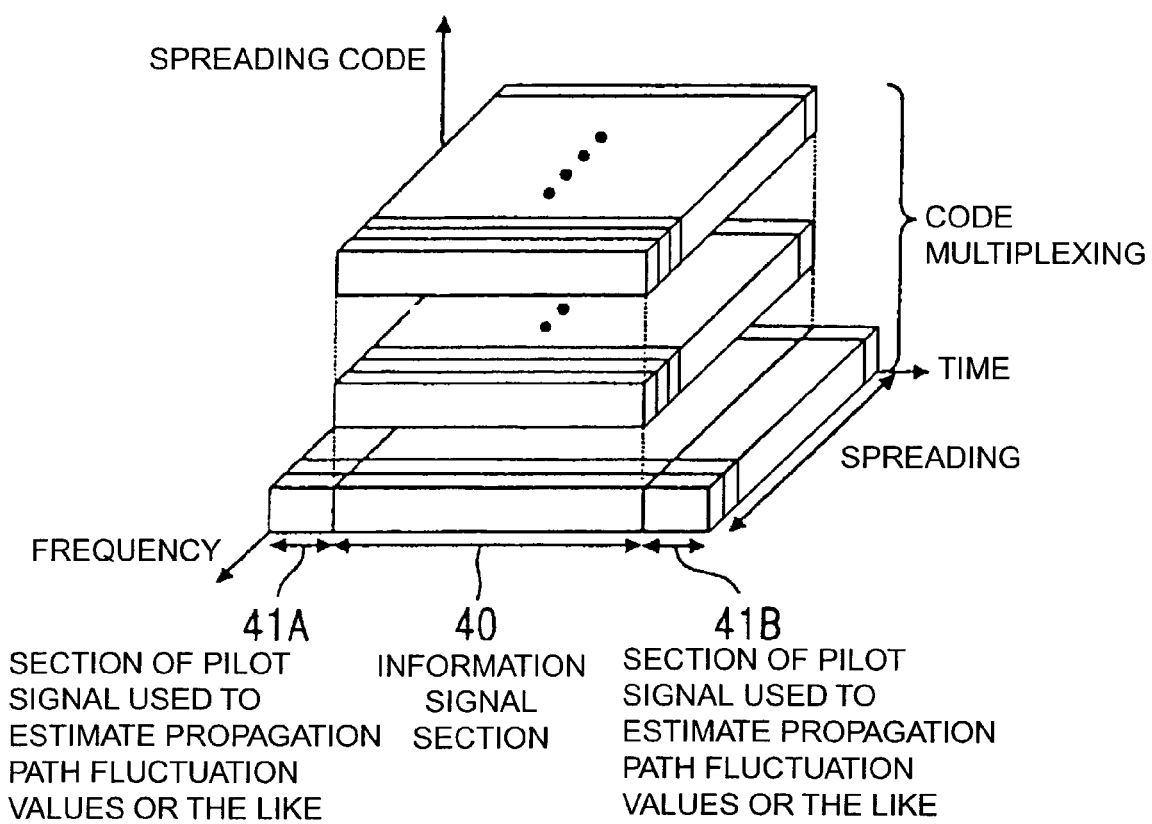
Figure 5:
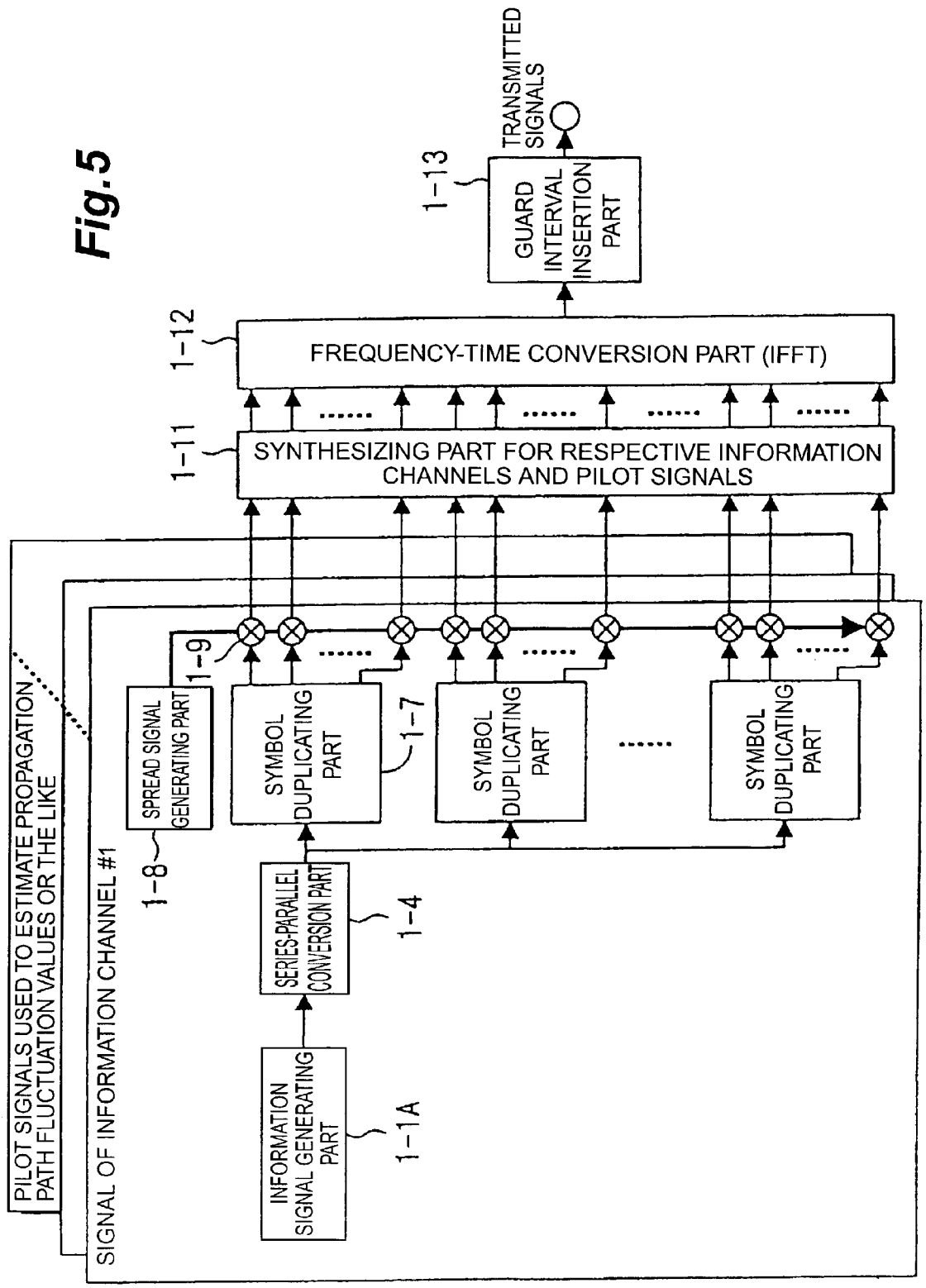
FIG. 5 is a block diagram which shows a construction used to estimate propagation path fluctuation values or the like in the transmitting apparatus.
Figure 6:
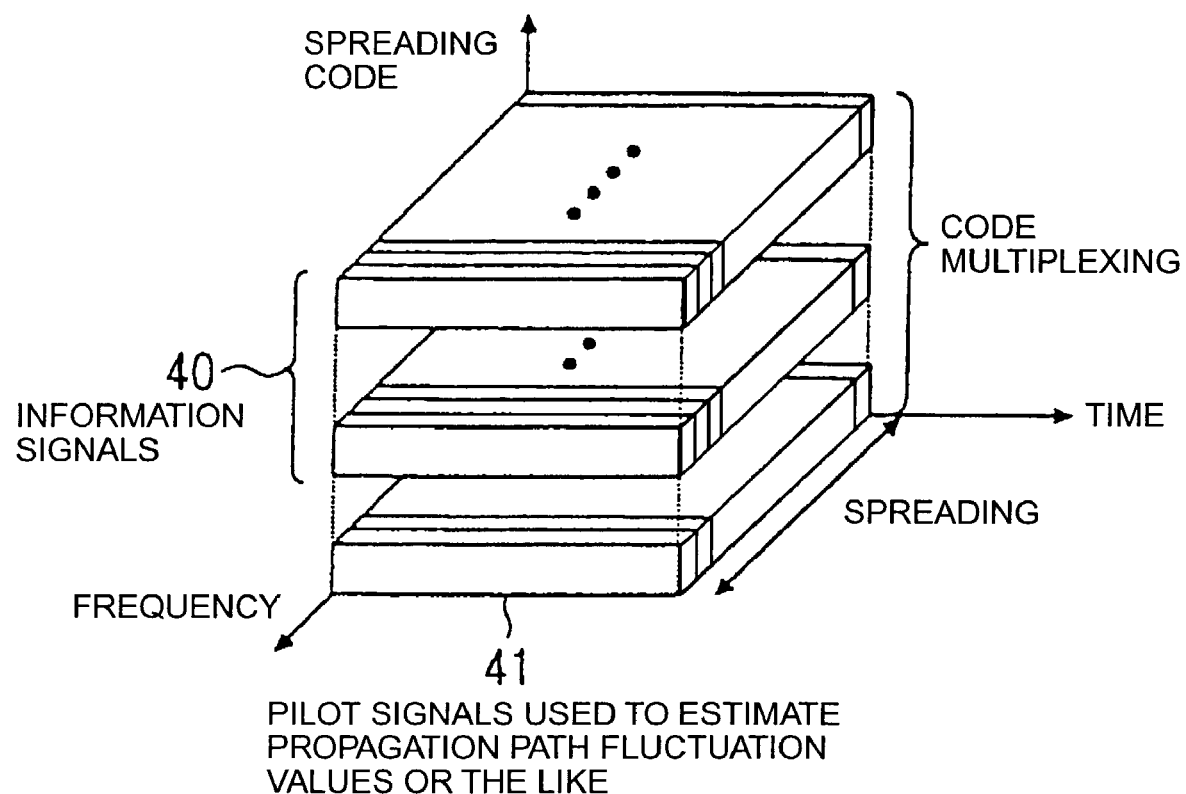

As is shown in FIG. 4, the transmitted signals have a construction in which an information signal section 40 and pilot signal sections 401A and 41B are multiplexed in terms of time. However, as is shown in FIGS. 5 and 6, a code-multiplexing construction in which the information signals and pilot signals are spread by means of different spreading codes and multiplexed may also be used. Specifically, in FIG. 5, the transmitting apparatus is constructed so that this apparatus includes an information signal generating part 1-1A, a series-parallel conversion part 1-4, symbol duplicating parts 1-7, a spreading code generating part 1-8 and multipliers 1-9. Furthermore, a combining part 1-11 for the respective information channels and pilot signals, a frequency-time conversion part (IFFT) 1-12 and a guard interval insertion part 1-13 are installed in common for the signals of the information channels #1 through #n, the pilot signals used to update the weighting, and the pilot signals used to estimate propagation path fluctuation values or the like. Moreover, the output of the guard interval insertion part 1-13 constitutes the transmitted signals. In such a construction, the information signals 40 and pilot signals 41 are spread by means of different spreading codes and code-multiplexed as shown in FIG. 6.

Figure 7:
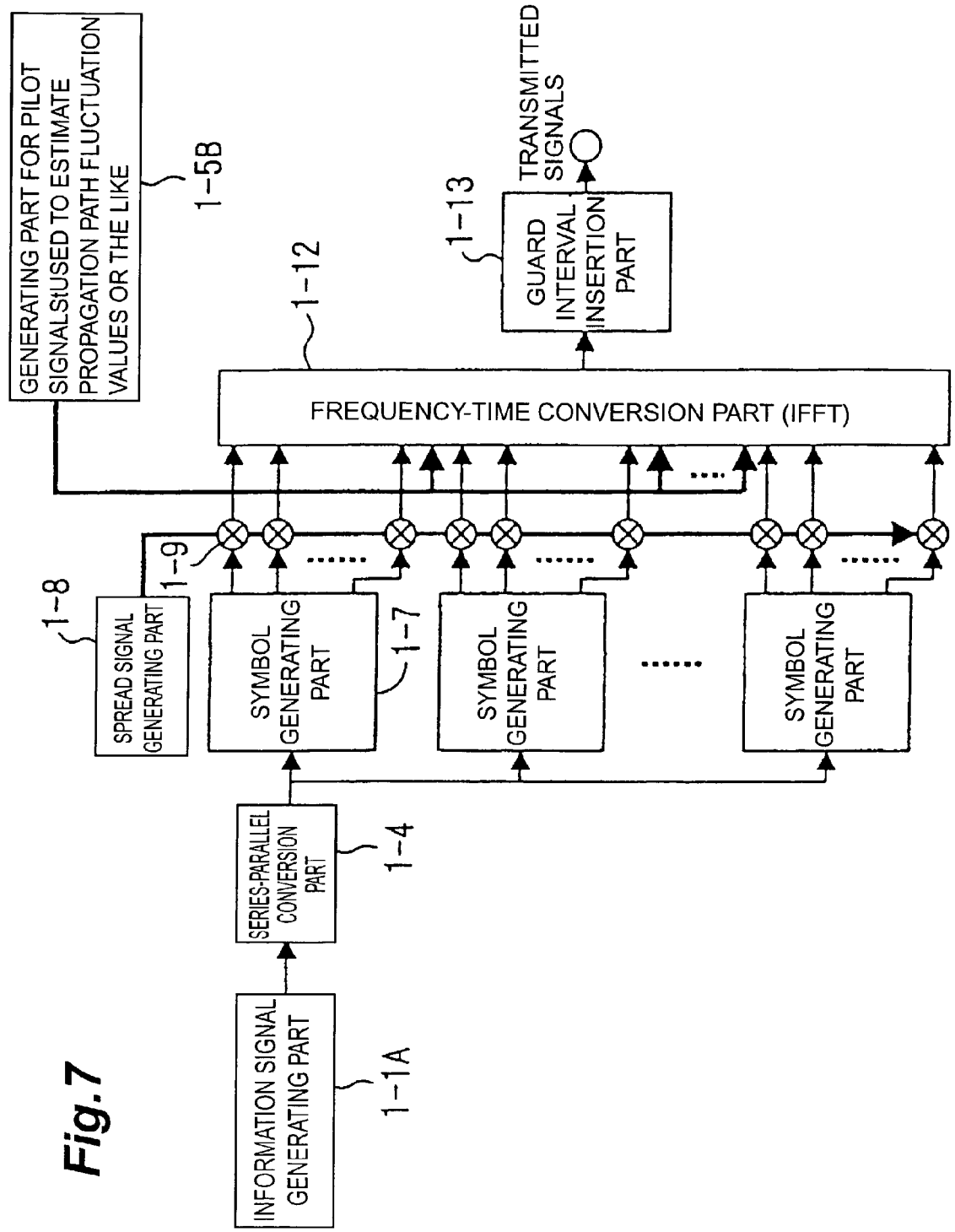
FIG. 7 is a block diagram which shows a construction used to estimate propagation path fluctuation values or the like in the transmitting apparatus.
Figure 8:
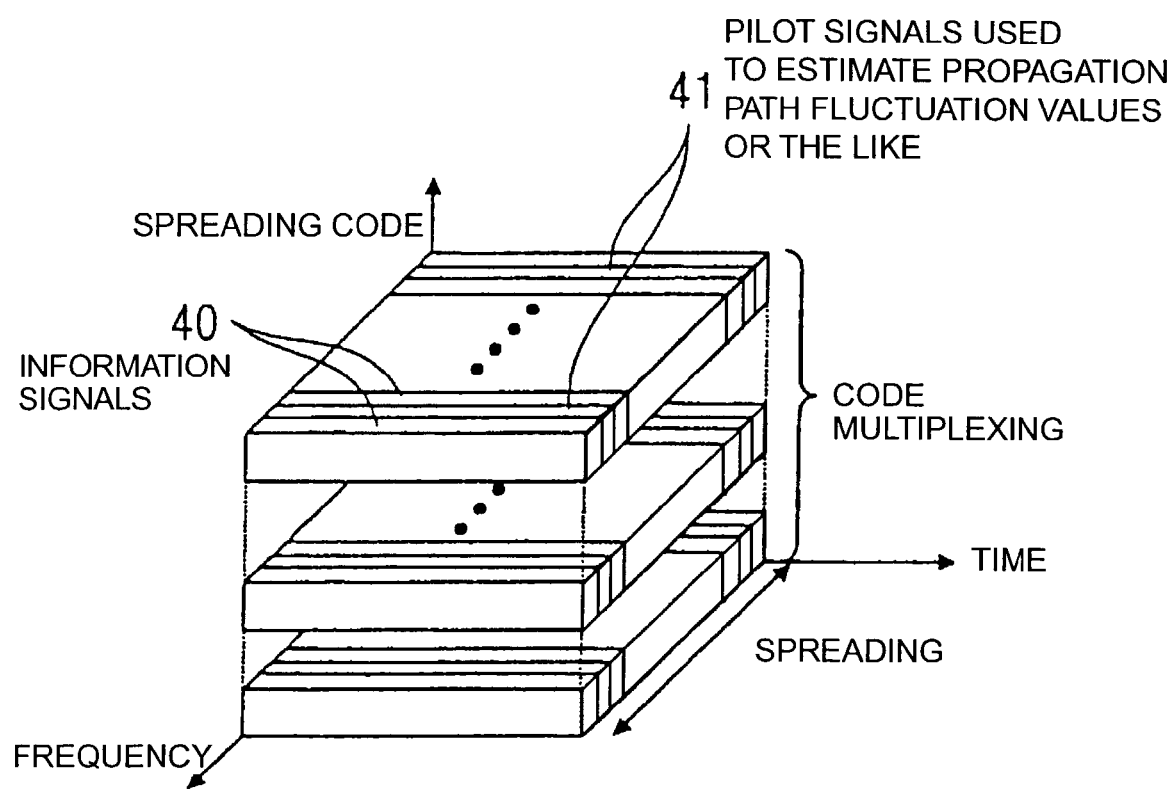

Furthermore, a frequency-multiplexing construction in which the pilot signals are multiplexed with a certain specified sub-carrier frequency may also be used as shown in FIGS. 7 and 8. Specifically, in FIG. 7, the transmitting apparatus is constructed so that this apparatus includes an information signal generating part 1-1A, a series-parallel conversion part 1-4, symbol duplicating parts 1-7, a spread signal generating part 1-8, multipliers 1-9, a frequency-time conversion part (IFFT) 1-12 and a guard interval insertion part 1-13. The output of the part 1-5B that generates pilot signals used to estimate propagation path fluctuation values or the like is multiplexed n the frequency-time conversion part 1-12. In such a construction, the pilot signals 41 are multiplexed with a certain specified sub-carrier frequency among the information signals 40 as shown in FIG. 8.

Furthermore, in the respective examples described above, the pilot signals may be constructed as common pilot signals that are multiplied by a common spreading code in all of the information channels, or may be constructed as individual pilot signals that are multiplied by individual spreading codes for each information channel.

Figure 9:
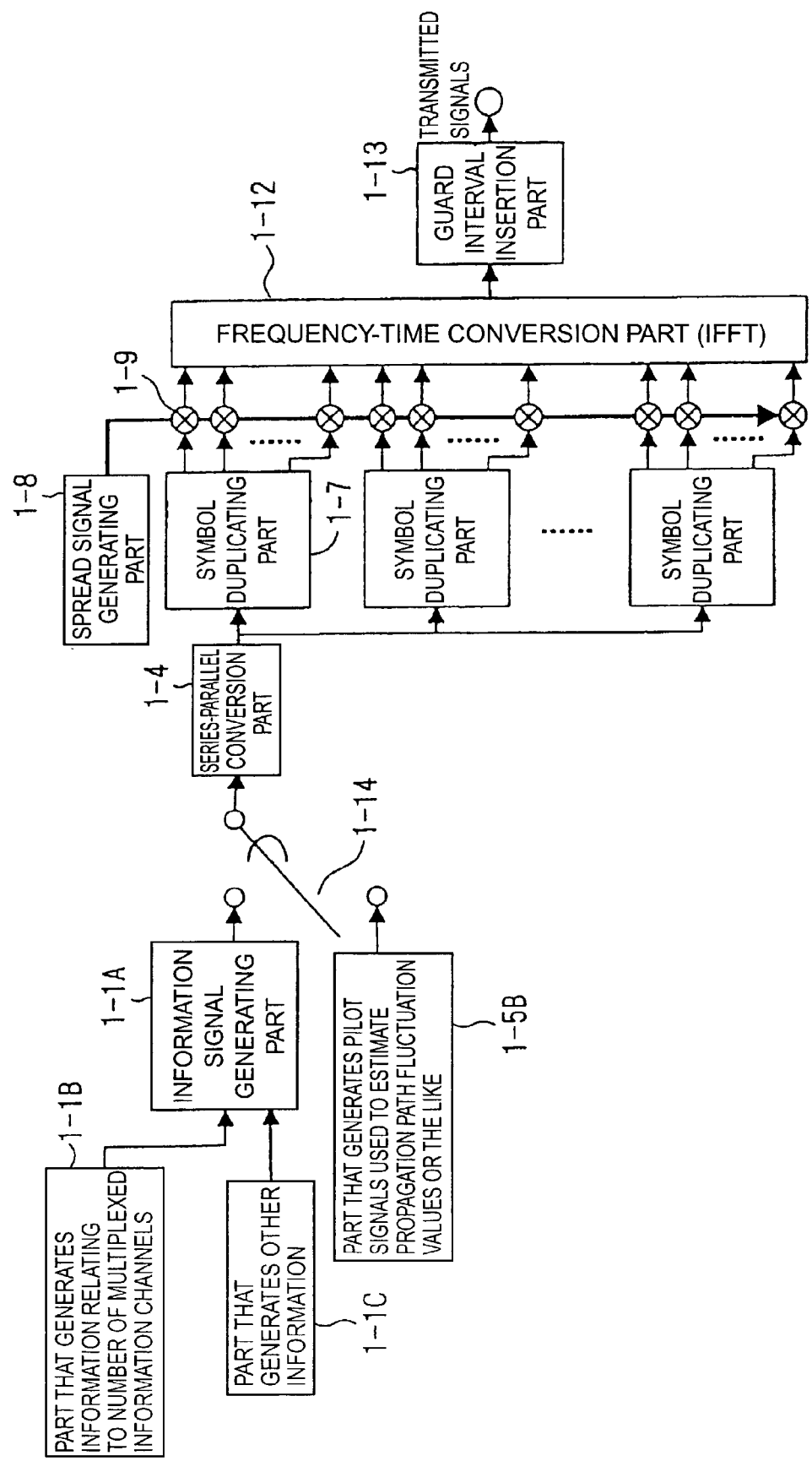
FIG. 9 is a block diagram which shows a construction used to indicate the number of multiplexed information channels in the transmitting apparatus.

As one example of an embodiment in the present invention, a portion of the construction of a transmitting apparatus in which information relating to the number of multiplexed information channels is sent from the transmitting side to the receiving side separately from the information signals in order to control the weighting used in MMSE combining by utilizing information such as the estimated values of the propagation path fluctuation or the like is shown in FIG. 9.

In this figure, the transmitting apparatus is constructed so that this apparatus includes an information signal generating part 1-1A, a series-parallel conversion part 1-4, symbol duplicating parts 1-7, a spread signal generating part 1-8, multipliers 1-9, a frequency-time conversion part (IFFT) 1-12 and guard interval insertion part 1-13. Furthermore, the output of the part 1-1B that generates information relating to the number of multiplexed information channels and the output of the part 1-1C that generates other information are input into the information signal generating part 1-1A. The output of the information signal generating part 1-1A and the output of the part 1-5B that generates signals used to estimate the propagation path fluctuation values or the like are switched by the switching device 1-14 and input into the series-parallel conversion part 1-4.

In this embodiment, information relating to the number of multiplexed channels is inserted into the information signals and subjected to data modulation. The information relating to the number of multiplexed information channels is converted into multi-carrier CDMA signals by the same procedure as that used for the information signals, i. e., by series-parallel conversion, duplication in the direction of the frequency axis, multiplication of spread signals in the direction of the frequency axis, and frequency-time conversion. Furthermore, information relating to the number of multiplexed information channels may also be sent to the receiving side by a separate transmission system.

Figure 10:
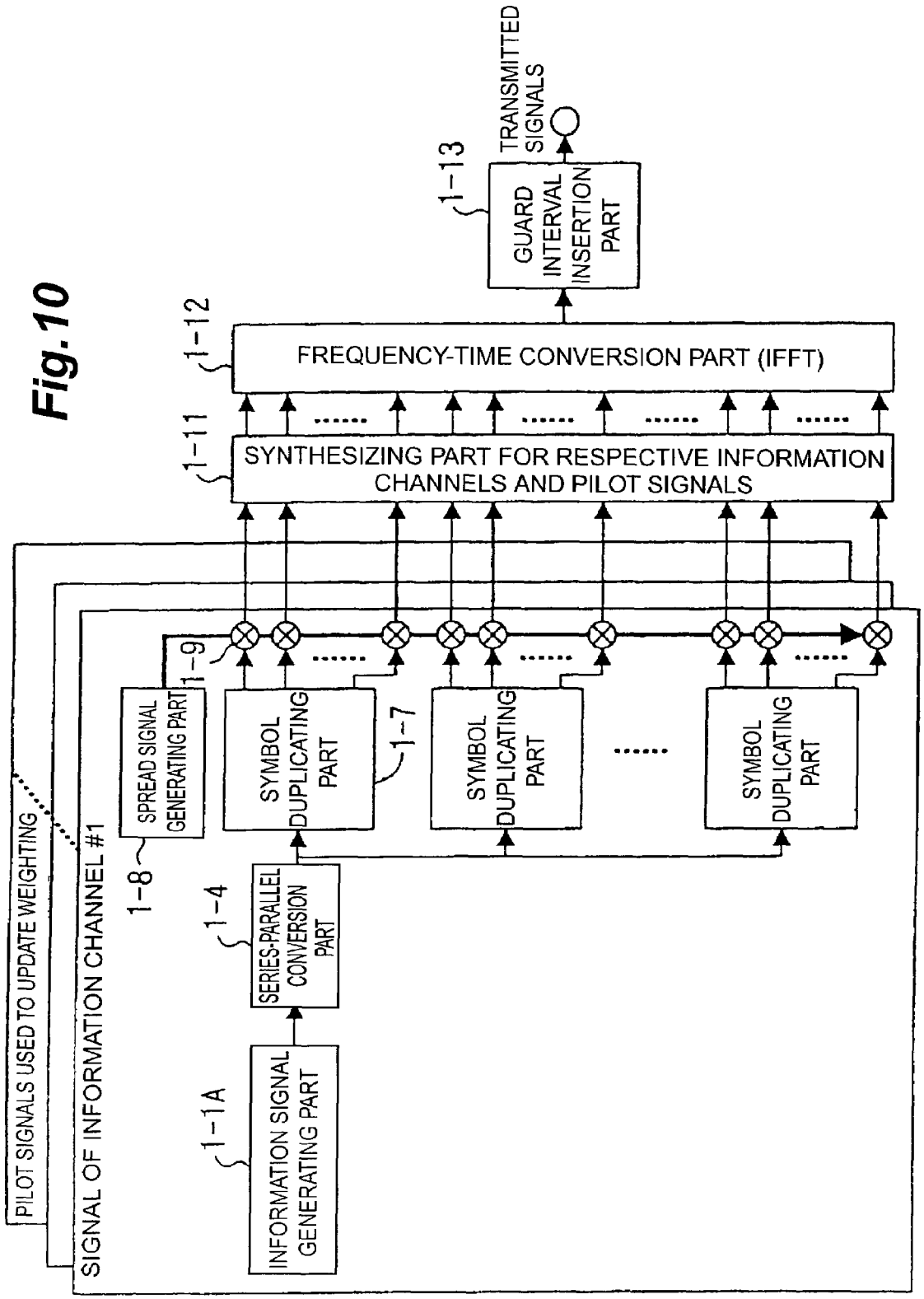
FIG. 10 is a block diagram which shows a construction used for successive updating of the weighting in the transmitting apparatus.

As one example of an embodiment in the present invention, a portion of the construction that is used in the transmitting apparatus when pilot signals that are utilized as reference signals are transmitted separately from the information signals used for successive updating of the weighting by means of an adaptive algorithm is shown in FIG. 10.

In this figure, the transmitting apparatus is constructed so that this apparatus includes an information signal generating part 1-1A, a series-parallel conversion part 1-4, symbol duplicating parts 1-7, a spread signal generating part 1-8 and multipliers 1-9. Furthermore, a combining part 1-11 for the respective information channels and pilot signals, a frequency-time conversion part (IFFT) 1-12 and a guard interval insertion part 1-13 are installed in common for the signals of the information channels #1 through #n and the pilot signals used to update the weighting. Moreover, the output of the guard interval insertion part 1-13 constitutes the transmitted signals.

In this embodiment, the pilot signals that are used to update the weighting are converted into multi-carrier CDMA signals by the same procedure as that used for the information signals, i. e., i. e., by series-parallel conversion by the series-parallel conversion part 1-4, duplication in the direction of the frequency axis by the symbol duplicating parts 1-7, multiplication of the spread signals in the direction of the frequency axis by the multipliers 1-9 and the like, and frequency-time conversion by the frequency-time conversion part 1-12. Furthermore, the pilot signals may be transmitted in a different signal format from that of the information signals.

Figure 11:
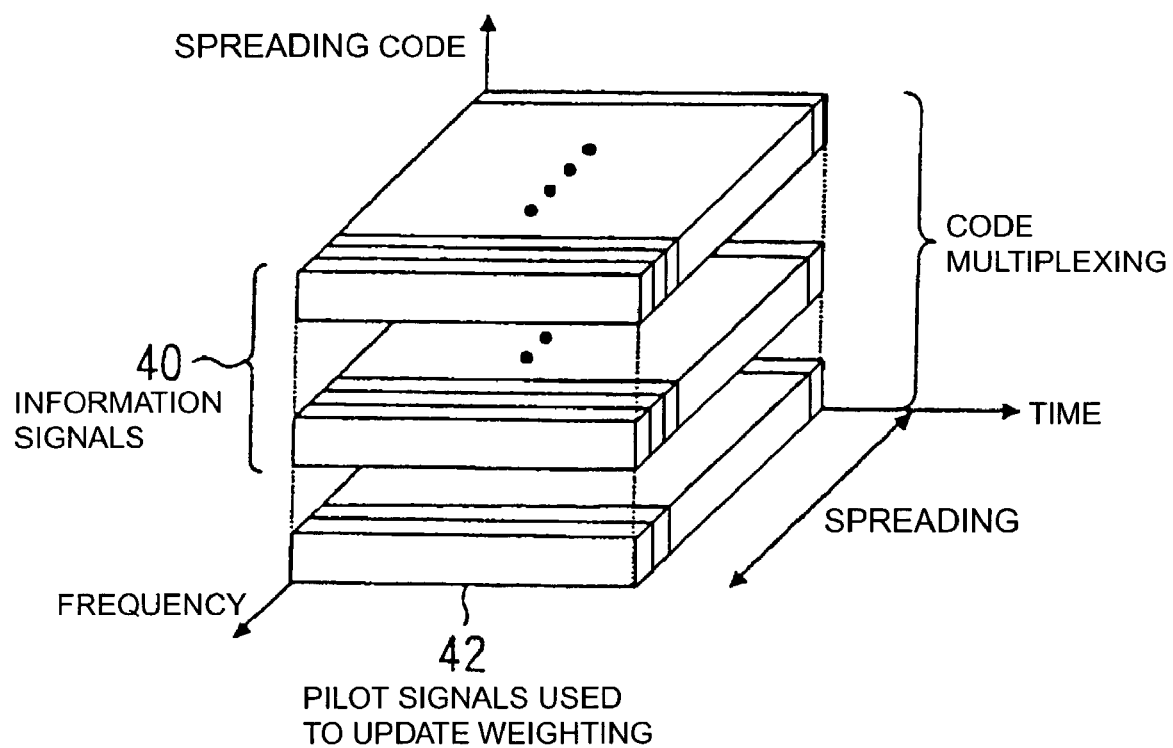
FIG. 11 is a diagram which shows one example of the transmission format of pilot signals used to update the weighting.

As is shown in FIG. 11, the transmitted signals have a construction in which the information signals 40 and pilot signals 42 are spread and code-multiplexed by different spreading codes. However, as in the construction shown in FIGS. 3 and 4, a construction may also be used in which the information signals and the pilot signals used to update the weighting are multiplexed in terms of time. Alternatively, as in the construction shown in FIGS. 7 and 8, a construction may also be used in which the signals are frequency-multiplexed.

Figure 12:
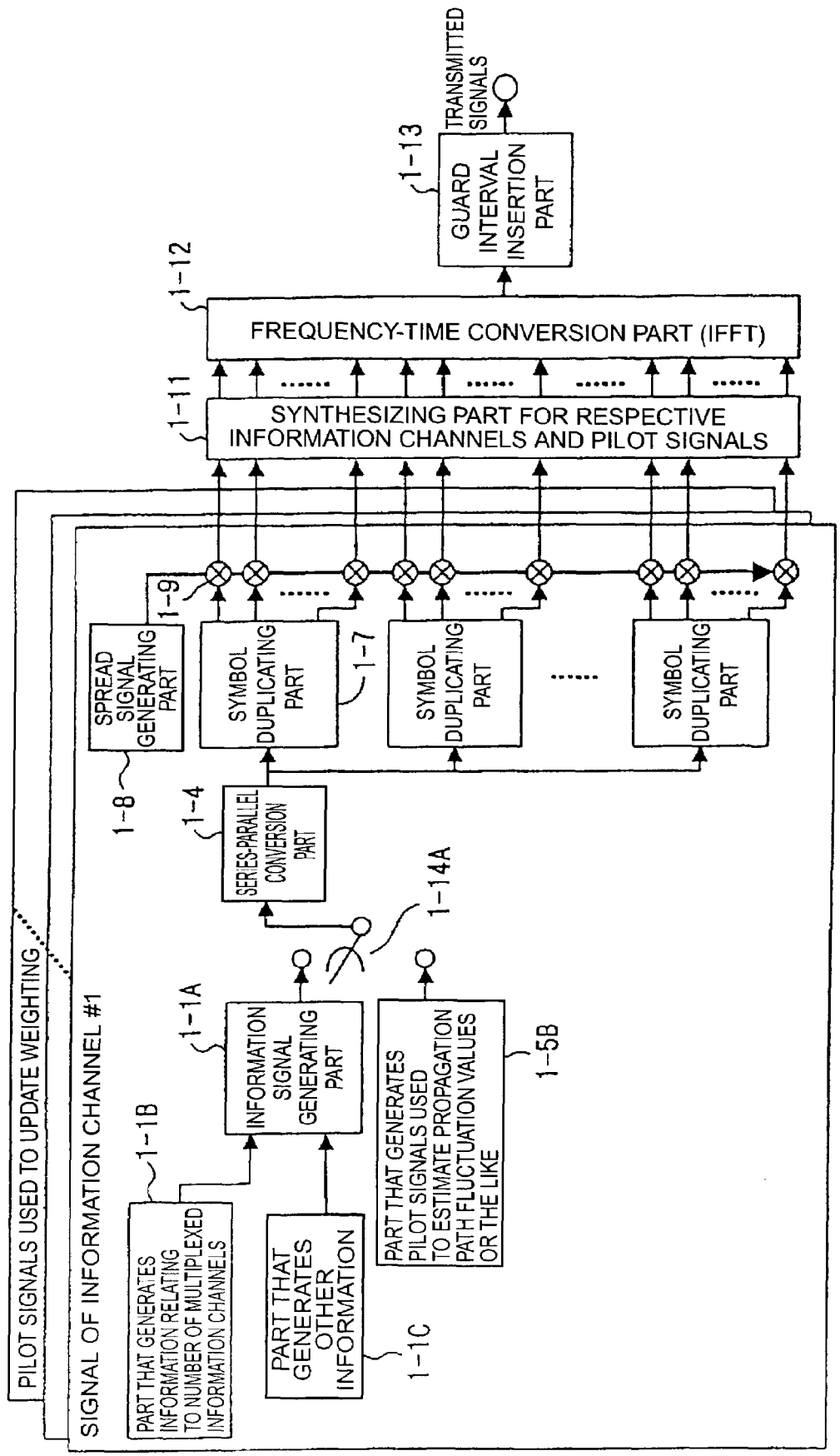
FIG. 12 is a block diagram which shows a construction used in a case where pilot signals used to estimate propagation path fluctuation values or the like and pilot signals used to update the weighting are simultaneously transmitted in the transmitting apparatus.

As one example of an embodiment in the present invention, a portion of the construction that is used in the transmitting apparatus when various types of pilot signals are simultaneously transmitted separately from the information signals in order to control the weighting used in MMSE combining is shown in FIG. 12.

In this figure, the transmitting apparatus is constructed so that this apparatus includes an information signal generating part 1-1A, a series-parallel conversion part 1-4, symbol duplicating parts 1-7, a spread signal generating part 1-8 and multipliers 1-9. Furthermore, a combining part 1-11 for the respective information channels and pilot signals, a frequency-time conversion part (IFFT) 1-12 and a guard interval insertion part 1-13 are installed in common for the signals of the information channels #1 through #n and the pilot signals used to update the weighting. Furthermore, the output of the guard interval insertion part 1-13 constitutes the transmitted signals. The output of the part 1-1B that generates information relating to the number of multiplexed information channels and the output of the part 1-1C that generates other information are input into the information signal generating part 1-1A. The output of the information signal generating part 1-1A and the output of the part 1-5B that generates signals used to, estimate the propagation path fluctuation values or the like are switched by the switching device 1-14 and input into the series-parallel conversion part 1-4.

Figure 13:
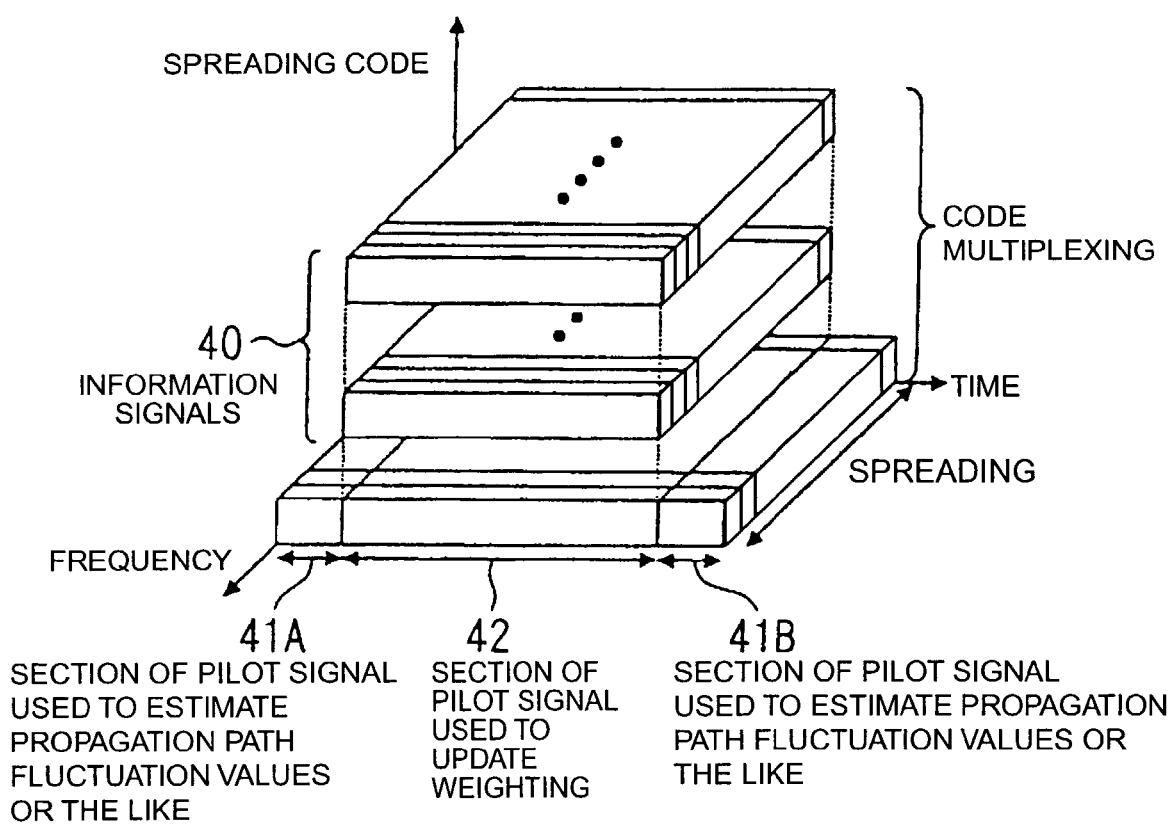
FIG. 13 is a diagram which shows one example of the transmission format used in a case where pilot signals used to estimate propagation path fluctuation values or the like and pilot signals used to update the weighting are simultaneously transmitted.

In this embodiment, as is shown in FIG. 13, the pilot signals 41A and 41B that are used to estimate the propagation path fluctuation values or the like and the information signals 40 are multiplexed in terms of time, and the pilot signals 42 used to update the weighting and the information signals 40 are code-multiplexed by means of different spreading codes. However, the pilot signals used to estimate the propagation path fluctuation values or the like may also be code-multiplexed or frequency-multiplexed with the information signals. Furthermore, the pilot signals used to update the weighting may also be code-multiplexed or frequency multiplexed with the information signals.

Figure 14:
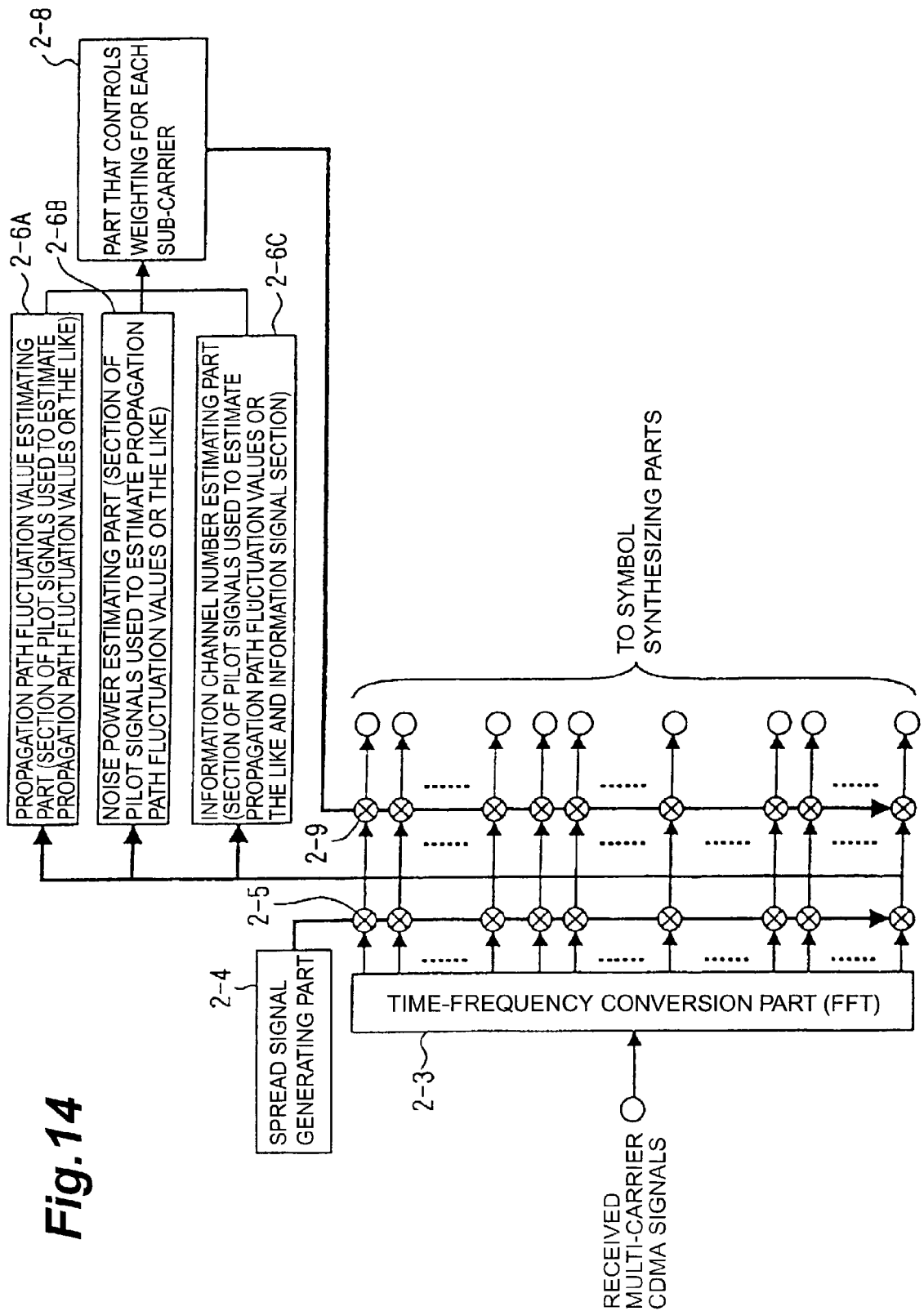
FIG. 14 is a block diagram which shows a construction used to calculate the weighting from the estimated values of the propagation path fluctuation values or the like in the receiving apparatus.

As one example of an embodiment in the present invention, the construction of the receiving apparatus that estimates the propagation path fluctuation values, noise power and number of multiplexed information channels or the like on the side of the receiving apparatus and calculates the weighting used in MMSE combining from the estimated values in a case where pilot signals used to estimate the propagation path fluctuation values or the like are transmitted is shown in FIG. 14.

In this figure, the receiving apparatus is constructed so that this apparatus includes a time-frequency conversion part (FFT) 2-3, a spread signal generating part 2-4, and multipliers 2-5 and 2-9. Furthermore, the apparatus also includes a part 2-6A that estimates propagation path fluctuation values or the like, a noise power estimating part 2-6B, an information channel number estimating part 2-6C, and a part 2-8 for controlling the weighting of each sub-carrier, into which the outputs of the abovementioned parts are input. Furthermore, an example of the state following the separation of the received multi-carrier CDMA signals into signal components of the respective sub-carriers by the frequency-time conversion part (FFT) is shown in FIG. 14.

In such a construction, the components of the signals of the respective sub-carriers are multiplied in the direction of the frequency axis in the multipliers 2-5 by the same spread signals as those by which the signals were multiplied in the transmitting apparatus, so that the effects of multiplication by the spread signals are eliminated. Then, in the part 2-6A that estimates propagation path fluctuation values or the like, the effects of the propagation path fluctuation values to which the transmitted signals are subjected while traveling from the transmitting apparatus to the receiving apparatus are estimated for each sub-carrier frequency using the section of the pilot signals used to estimate propagation path fluctuation values or the like. These effects can be estimated from the amount of fluctuation of the signals, utilizing the fact that the pilot signals used to estimate the propagation path fluctuation values or the like have a known amplitude, phase and pattern.

Furthermore, in the noise power estimating part 2-6B, the noise power for each sub-carrier is estimated by estimating the dispersion of the section of the pilot signals used to estimate propagation path fluctuation values or the like, which are signals with a known amplitude, phase and pattern. Furthermore, in the information channel number estimating part 2-6C, as is shown in FIG. 4, the number of multiplexed information channels is estimated by calculating the ratio of the received power of the section of the pilot signals used to estimate propagation path fluctuation values or the like and the received power of the information signal section in which the information signals of the respective mobile stations are code-multiplexed. Then, in the weighting control part 2-8, the weighting for each sub-carrier ($w_m$: m is the sub-carrier number) is calculated as $w_m = h_m/(N_n|h_m|^2 + \sigma_n^2)$ using the estimated propagation path fluctuation values ($h_m$: m is the sub-carrier number), noise power ($\sigma_n^2$) and number of multiplexed information channels ($N_n$), so that the mean square error of the signals following combining is minimized. The method used to calculate the weighting in this case is indicated in the Reference A. Accordingly, the present invention is characterized in that the propagation path fluctuation values, noise power and number of multiplexed information channels that are required in order to calculate the weighting can be appropriately estimated from the information signals and pilot signals that are used to estimate propagation path fluctuation values or the like.

It is desirable that the mean square error of the signals following combining be 0.1 or less. The reason for this is as follows: namely, in cases where the weighting shows sufficient convergence, the mean square error is ordinarily kept to a value of approximately 0.1 to 0.01. Furthermore, there are also cases in which the mean square error is 0.01 or less if the propagation environment is good.

Furthermore, in the present invention, as is shown in FIG. 9, since the number of multiplexed information channels is sent from the transmitting side, the appropriate number of channels can be obtained on the receiving side. Furthermore, the weighting used in MMSE combining is calculated after the propagation path fluctuation values and noise power have been estimated by the same method as that of the invention described in claim 6. Moreover, the present invention may also be used in cases where information channels that are multiplexed by spreading codes that are orthogonal to each other using mutual different multi-value modulation systems and spreading code periods.

Figure 15:
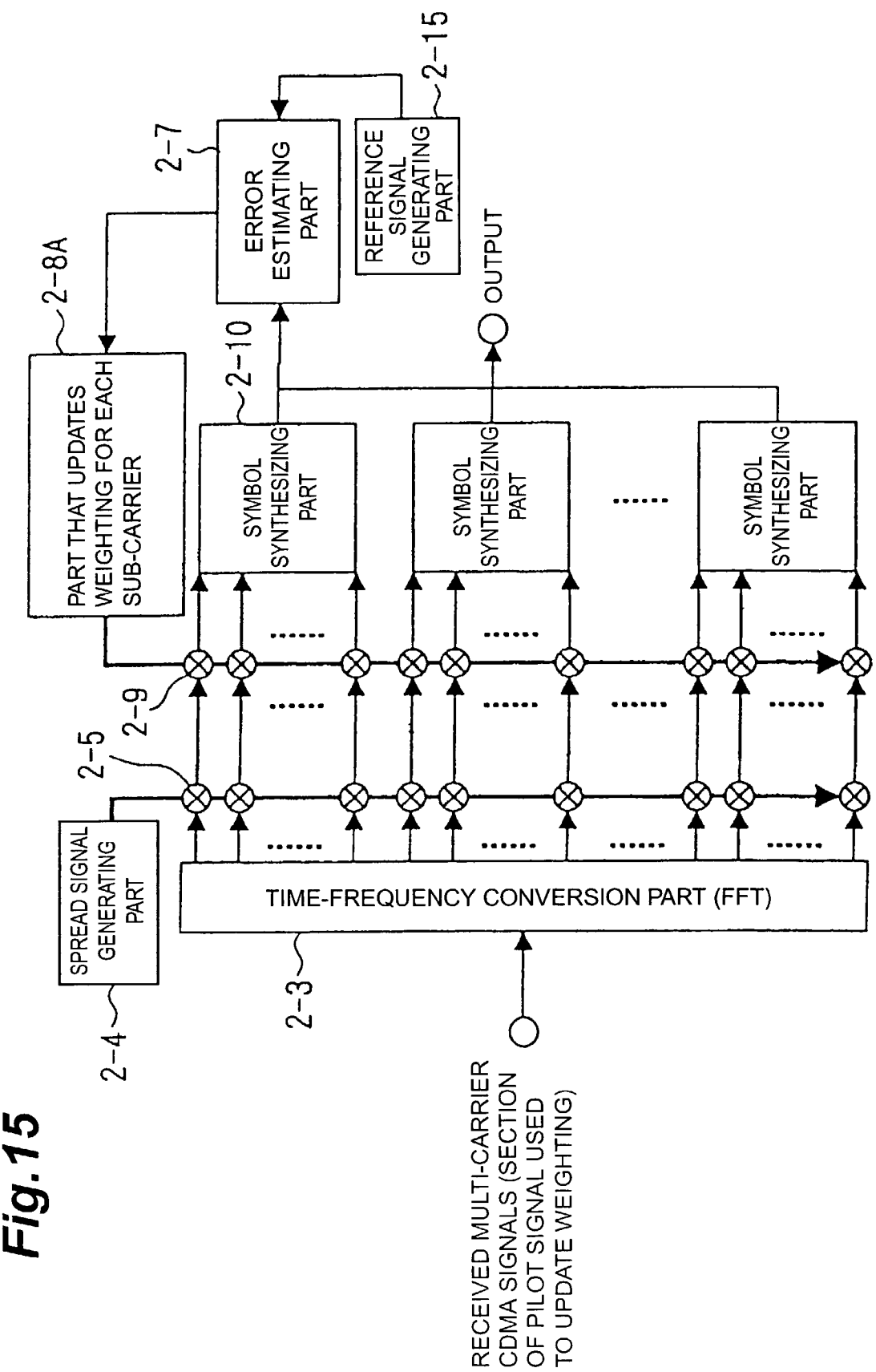
FIG. 15 is a block diagram which shows a construction used for successive updating of the weighting in the receiving apparatus.

As one example of an embodiment in the present invention, the construction of the receiving apparatus that is used for successive updating of the weighting using the section of the pilot signals used to update the weighting in a case where the pilot signals used to update the weighting shown in FIG. 10 are transmitted is shown in FIG. 15.

In this figure, the receiving apparatus is constructed so that this apparatus includes a time-frequency conversion part (FFT) 2-3, a spread signal generating part 2-4, multipliers 2-5 and 2-9 and symbol combining parts 2-10. Furthermore, the receiving apparatus also includes a reference signal generating part 2-15, an error estimating part 2-7 that inputs the output of the reference signal generating part 2-15, and a part 2-8A that updates the weighting for each sub-carrier, and the output of this weighting control part 2-8 is input into the multipliers 2-9. Furthermore, in FIG. 15, in regard to the section of the pilot signals used to update the weighting in the received multi-carrier CDMA signals, an example of the state following separation of the signals into the signal components of the respective sub-carriers by the frequency-time conversion part (FFT) is shown.

The components of the signals of the respective sub-carriers multiplied in the direction of the frequency axis by the same spread signals as those by which the signals were multiplied in the transmitting apparatus, so that the effects of multiplication by the spread signals are eliminated. Then, the signals are multiplied by the successively updated weighting for each sub-carrier, and are synthesized across the spreading period in the symbol combining parts 2-10. Afterward, in the error estimating part 2-7, the error between the synthesized signals and the pilot signals used to update the weighting, which have a known amplitude, phase and pattern, is estimated. Then, in the weighting control part 2-8, the weighting is successively updated by means of an adaptive algorithm so that the mean square error is minimized.

The received signals of each sub-carrier in the information signal section are multiplied by the updated weighting in the section of the pilot signals used to update the weighting, and the received signals of the respective sub-carriers are synthesized by the symbol combining parts, so that the signals are subjected to despreading. The weighting updating method is indicated in the Reference B. Here, furthermore, a method was described in which the weighting was successively updated using the section of the pilot signals used to update the weighting; however, updating of the weighting may also be performed by adding the information signal section. In this case, signals obtained by a judgement feedback of the signals synthesized in the symbol combining parts or the like are used as the reference symbols that are necessary in order to estimate the error.

Figure 16:
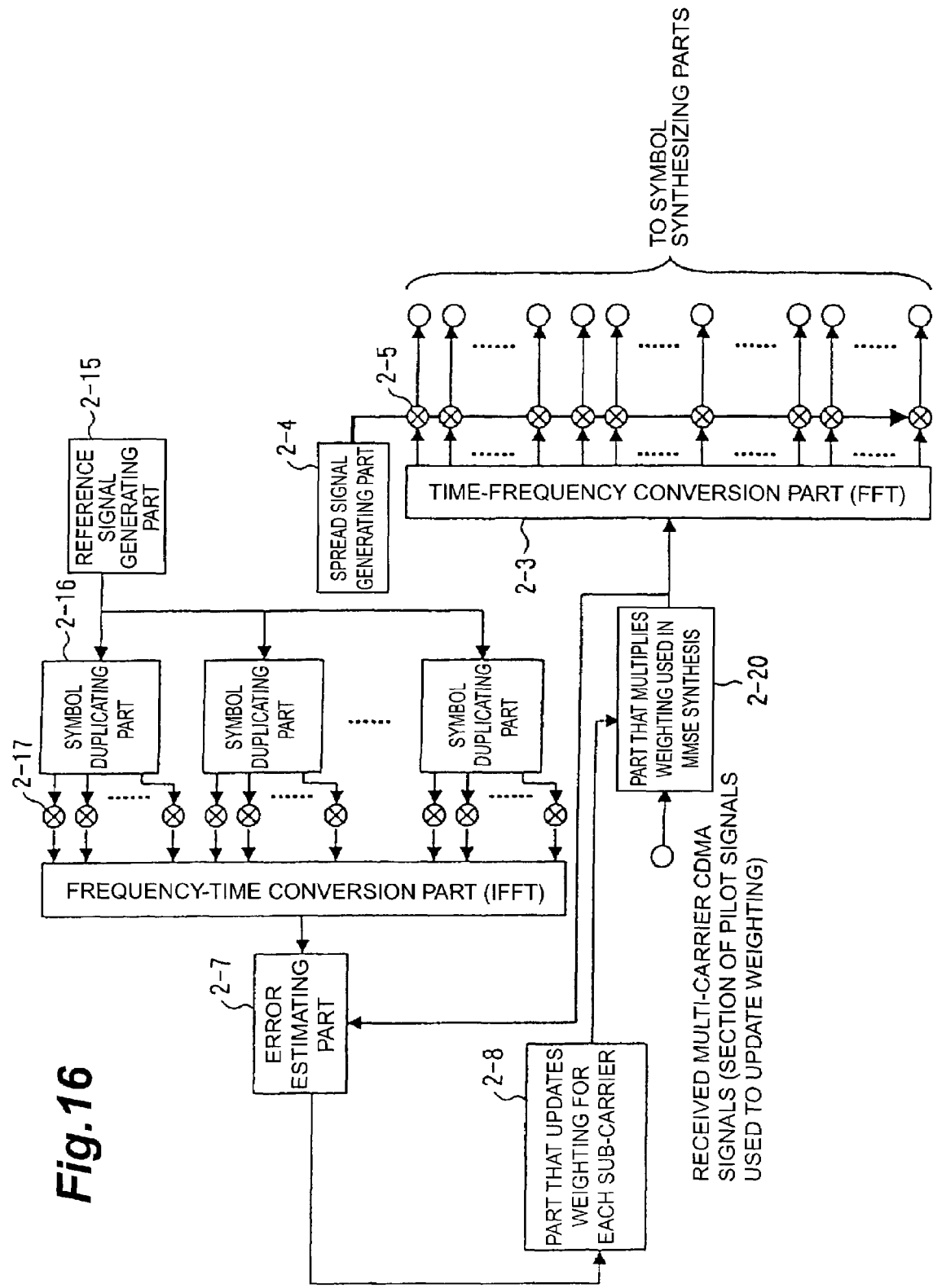
FIG. 16 is a block diagram which shows a construction used for successive updating of the weighting utilizing signals prior to the reception FFT treatment in the receiving apparatus.

As one example of an embodiment in the present invention, the construction of the receiving apparatus as shown in FIG. 10 that successively updates the weighting using the section of the pilot signals used to update the weighting so that the mean square error between the signals prior to the reception FFT treatment and the signals that are actually transmitted is minimized in a case where pilot signals used to update the weighting are transmitted is shown in FIG. 16.

In this figure, the receiving apparatus is constructed so that this apparatus includes a time-frequency conversion part (FFT) 2-3, a spread signal generating part 2-4 and multipliers 2-5. Furthermore, the apparatus also includes a reference signal generating part 2-15, symbol duplicating parts 2-16, multipliers 2-17, a frequency-time conversion part (IFFT) 2-18, an error estimating part 2-7, a part 2-8 that updates the weighting for each sub-carrier, and a part 2-20 that multiplies the weighting used in MMSE combining. The output of this weighting multiplying part 2-20 is input into the time-frequency conversion part 2-3.

In this embodiment, after reference signals that are known on the receiving side are first subjected to a series-parallel conversion, the respective symbols are duplicated in the symbol duplicating parts 2-16 a number of times that is equal to the spreading period of the spreading code, and the respective duplicated symbols are multiplied by spread signals corresponding to the pilot signals used to update the weighting. Afterward, these signals are converted by the time-frequency conversion part 2-18, thus producing reference multi-carrier CDMA signals.

Then, in the error estimating part 2-7, the error between the reference multi-carrier CDMA signals and signals obtained by multiplying the received CDMA signals by the weighting used in MMSE combining is estimated, and in the weighting updating part 2-8, the weighting is successively updated so that the mean square error is minimized. Here, furthermore, a method was described in which the weighting was successively updated using the section of the pilot signals used to update the weighting; however, updating of the weighting could also be performed by adding the information signal section. In this case, signals obtained by a judgement feedback of the signals synthesized in the symbol combining parts or the like are used as the reference symbols that are necessary in order to estimate the error.

Figure 17:
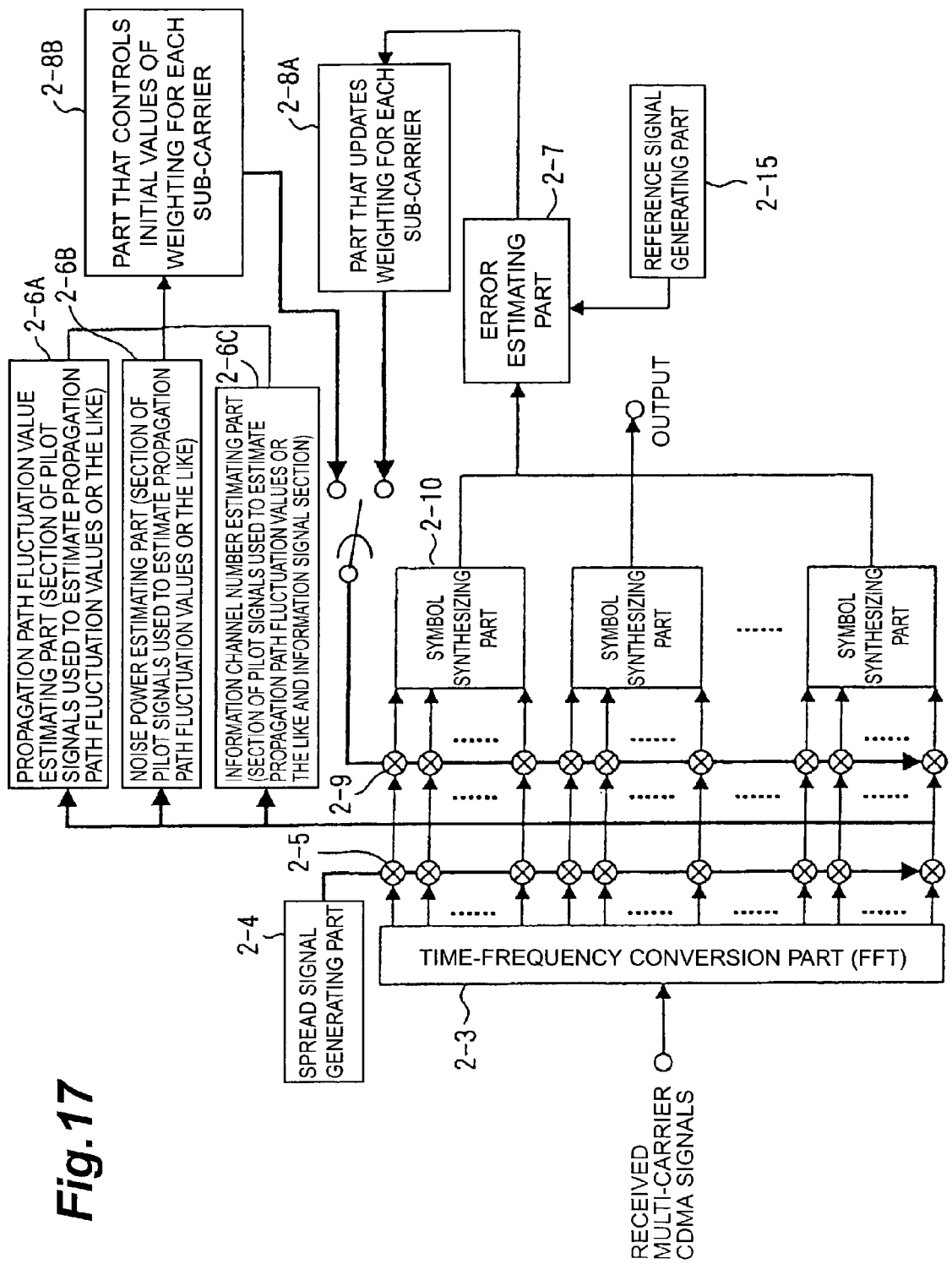
FIG. 17 is a block diagram which shows a construction used to control the weighting using pilot signals used to estimate propagation path fluctuation values or the like and pilot signals used for updating of the weighting in the receiving part.

As an example of an embodiment in the present invention, one example of the construction used to perform successive updating of the weighting using pilot signals for updating of the weighting following the determination of the initial values of the weighting using pilot signals used to estimate propagation path fluctuation values or the like in a case where the pilot signals used to estimate the propagation path fluctuation values or the like and the pilot signals used to update the weighting shown in FIG. 12 are transmitted is shown in FIG. 17. In this figure, the receiving apparatus is constructed so that this apparatus includes a time-frequency conversion part (FFT) 2-3, a spread signal generating part 2-4, multipliers 2-5 and 2-9, and symbol combining parts 2-10. Furthermore, the apparatus also includes a part 2-6A that is used to estimate propagation path fluctuation values or the like, a noise power estimating part 2-6B, an information channel number estimating part 2-6C, a part 2-8B that controls the initial values of the weighting for each sub-carrier, into which the outputs of the abovementioned parts are input, a reference signal generating part 2-15, an error estimating part 2-7 into which the output of the reference signal generating part 2-15 is input, a part 2-8A that updates the weighting for each sub-carrier, and a switching device 2-21 that switches between the output of the a part 2-8A that updates the weighting for each sub-carrier and the output of the part 2-8B that controls the initial values of the weighting for each sub-carrier. The output of this switching device 2-21 is input into the multipliers 2-9.

Furthermore, an example of the state following the separation of the received multi-carrier CDMA signals into signal components of the respective sub-carriers by the frequency-time conversion part (FFT) is shown in FIG. 17. The components of the signals of the respective sub-carriers are multiplied in the direction of the frequency axis by the same spread signals as those by which the signals were multiplied in the transmitting apparatus, so that the effects of multiplication by the spread signals are eliminated. Then, the propagation path fluctuation values or the like are estimated in the section of the pilot signals used to estimate propagation path fluctuation values or the like and the information signal section, and the weighting for each sub-carrier is calculated using these values; the resulting weighting values are taken as the initial values. Afterward, the weighting is successively updated in the section of the pilot signals used to update the weighting. Furthermore, the estimation of the propagation path fluctuation values or the like that are needed in order to determine the initial values of the weighting may also utilize the section of the pilot signals used to update the weighting in addition to the section of the pilot signals used to estimate propagation path fluctuation values or the like and the information signal section. Furthermore, the updating of the weighting may also be performed by adding the section of the pilot signals used to estimate propagation path fluctuation values or the like, in which the amplitude, phase and pattern are known. Furthermore, in the information signal section, the updating of the weighting may be performed by adding signals obtained by a judgement feedback of the signals synthesized by the symbol combining parts.

Figure 18:
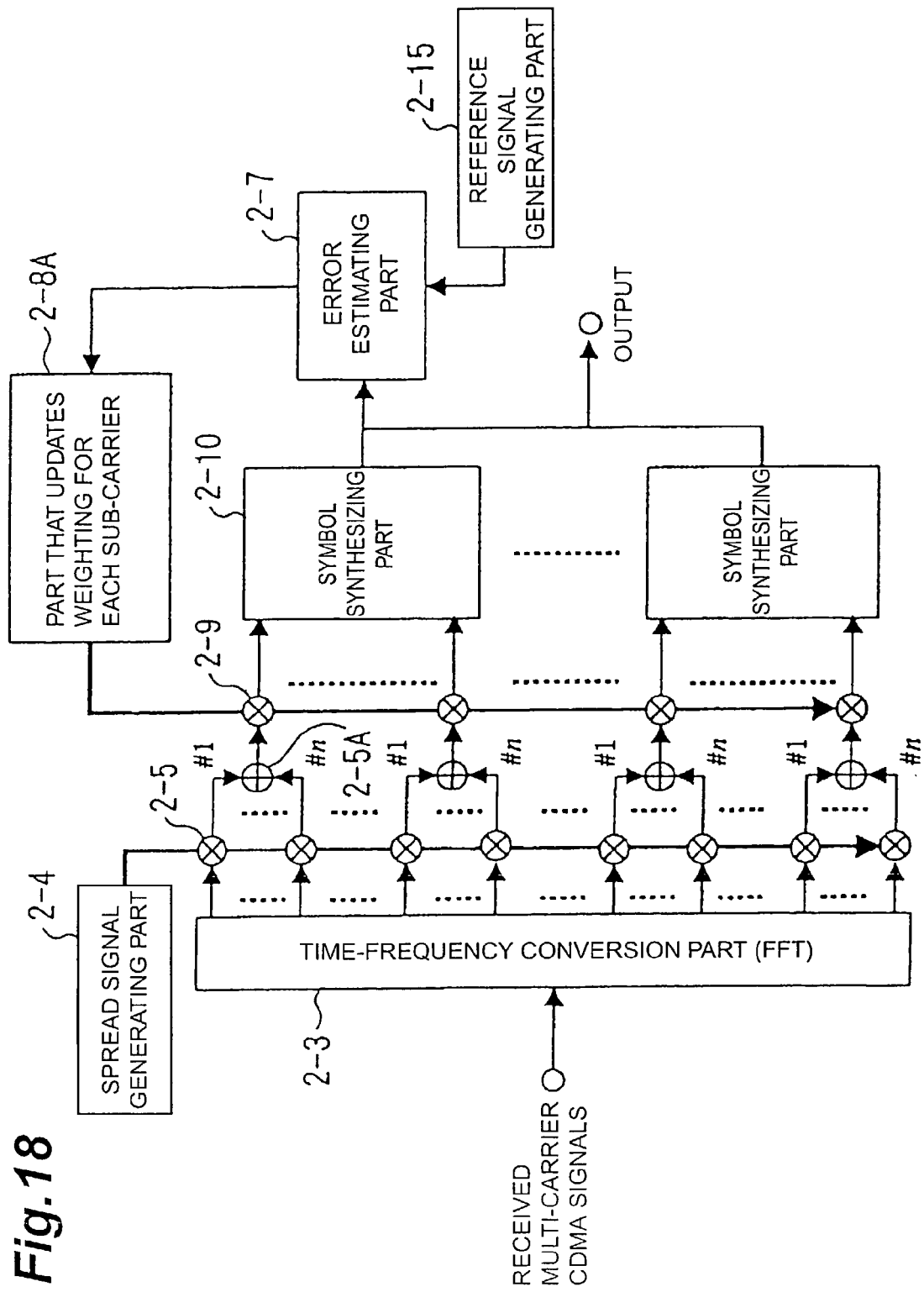
FIG. 18 is a block diagram which shows a construction used to control the weighting using pilot signals that are averaged in the frequency direction.

As one example of an embodiment in the present invention, a portion of a construction that performs successive updating of the weighting utilizing signals obtained by averaging the received signals of each sub-carrier in the frequency direction is shown in FIG. 18. In this figure, the receiving apparatus is constructed so that this apparatus includes a time-frequency conversion part (FFT) 2-3, a spread signal generating part 2-4, multipliers 2-5, adders 2-5A, multipliers 2-9, and symbol combining parts 2-10. The apparatus also includes a reference signal generating part 2-15, an error estimating part 2-7 into which the output of the reference signal generating part 2-15 is input, and a part 2-8A that updates the weighting for each sub-carrier. Furthermore, an example of the state following the separation of the received multi-carrier CDMA signals into signal components of the respective sub-carriers by the frequency-time conversion part (FFT) is shown in FIG. 18.

In such a construction, the components of the signals of the respective sub-carriers are multiplied in the direction of the frequency axis by the same spread signals as those by which the signals were multiplied in the transmitting apparatus, so that the effects of multiplication by the spread signals are eliminated. Then, signals obtained by adding n (n is a natural number) signals of the respective sub-carriers in the frequency direction are multiplied by the weighting, and the weighting is updated in the weighting updating part 2-8A so that the mean square error between the signals synthesized in the signal combining parts 2-10 and the reference signals is minimized. Especially in cases where an adaptive algorithm is used, the amount of calculation that is required in order to update the weighting increases according to the number of weighting values; however, by averaging in the frequency direction in this manner, it is possible to reduce the number of weighting values used in MMSE combining; accordingly, the amount of calculation required for updating can be reduced. Furthermore, the updating of the weighting may also utilize the section of the pilot signals used to estimate propagation path fluctuation values or the like and the information signal section in addition to the section of the pilot signals used to update the weighting. Furthermore, a construction in which the number n of sub-carriers averaged is equal in all cases is shown in FIG. 18; however, the number n of sub-carriers may also be appropriately varied.

Figure 19:
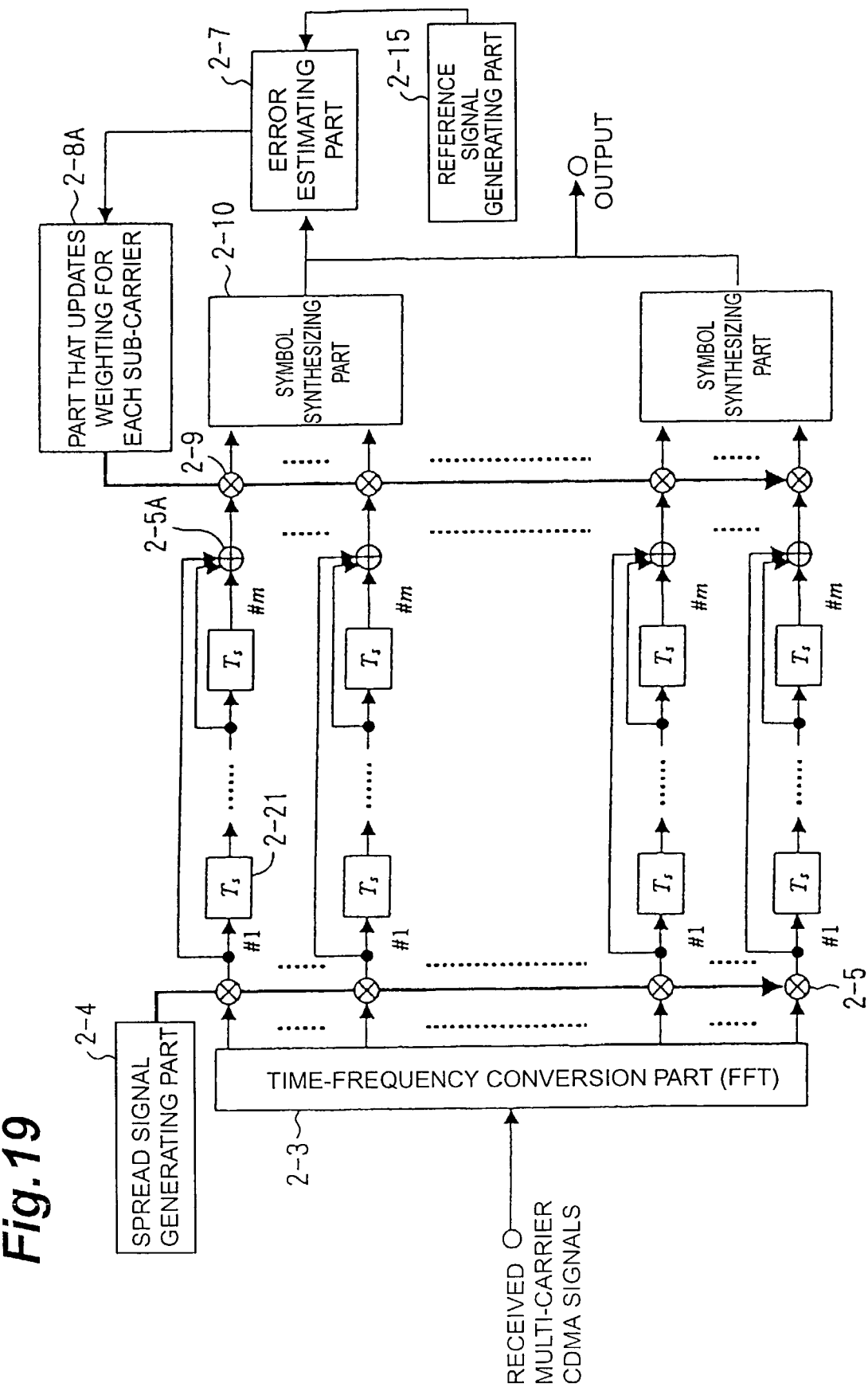
FIG. 19 is a block diagram which shows a construction used to control the weighting using pilot signals that are averaged in the time direction.
Figure 20B:
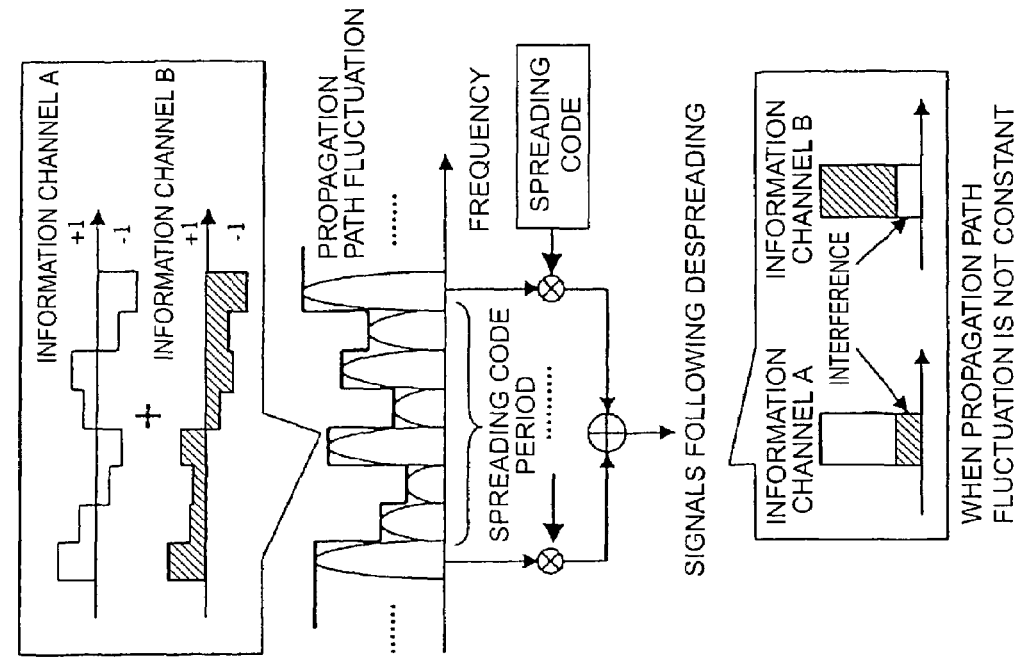
FIG. 20b is a diagram which shows the conditions of despreading of the multi-carrier CDMA received signals.
Figure 20A:
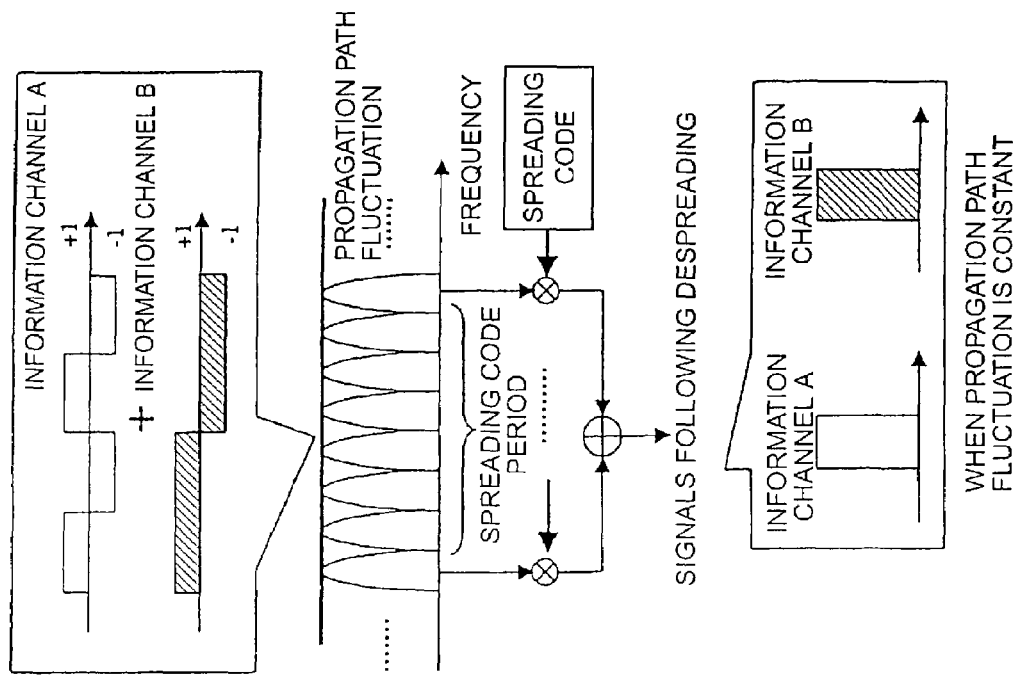
FIG. 20a is a diagram which shows the conditions of despreading of the multi-carrier CDMA received signals.

As one example of an embodiment in the present invention, a portion of a construction that performs successive updating of the weighting using signals in which the received signals are averaged in the time direction for each sub-carrier is shown in FIG. 19. In this figure, the receiving apparatus is constructed so that this apparatus includes a time-frequency conversion part (FFT) 2-3, a spread signal generating part 2-4, multipliers 2-5, m-1 delay devices (m is a natural number) that are used to add m received signals in the time direction, adders 2-5A, multipliers 2-9, and symbol combining parts 2-10. The apparatus also includes a reference signal generating part 2-15, an error estimating part 2-7 that inputs the output of the reference signal generating part 2-15, and a part 2-8A that updates the weighting for each sub-carrier. The output of this weighting updating part 2-8A is input into the multipliers 2-9. Furthermore, the delay time Ts of the delay device 2-21 is 1 multi-carrier CDMA symbol length.

An example of the state following the separation of the received multi-carrier CDMA signals into signal components of the respective sub-carriers by the frequency-time conversion part (FFT) is shown in FIG. 18. The components of the signals of the respective sub-carriers are multiplied in the direction of the frequency axis by the same spread signals as those by which the signals were multiplied in the transmitting apparatus, so that the effects of multiplication by the spread signals are eliminated. Then, signals obtained by adding m (m is a natural number) received signals in each sub-carrier in the time direction are multiplied by the weighting, and the weighting is updated in the weighting updating part so that the mean square error between the signals synthesized in the signal combining parts and the reference signals is minimized.

As a result of performing averaging in the time direction in this manner, the SNR of the signals used in the updating of the weighting is improved, and the precision and speed obtained when the weighting is updated to optimal values are improved. Furthermore, the updating of the weighting may also be performed using the utilize the section of the pilot signals used to estimate propagation path fluctuation values or the like and the information signal section in addition to the section of the pilot signals used to update the weighting.

Furthermore, a construction in which the number m of received signals averaged in the time direction is equal in all cases is shown in FIG. 19; however, the number m of received signals may also be appropriately varied.

The present invention may also adopt the following aspects:

(1) A multi-channel CDMA transmission method in which information symbols are duplicated and lined up in the direction of the frequency axis, these duplicated information symbols are multiplied by a spreading code in the direction of the frequency axis, and the respective spread symbols are transmitted by means of a plurality of sub-carriers with different frequencies, wherein the channel construction and construction of the transmitting part and receiving part that are required in order to perform combining (MMSE combining) by multiplying the received signals of the respective sub-carriers by weighting controlled for each sub-carrier so that the mean square error between the signals following despreading and the signals that are actually transmitted is minimized are used in order to reduce the effects of interference generated between the multiplexed information channels as a result of the destruction of the orthogonality between the spreading codes by the effects of the propagation path in cases where multiplexing is performed by multiplying the signals by mutually orthogonal spreading codes in the frequency direction in order to multiplex and transmit a plurality of information channels.

(2) The multi-channel CDMA transmission method described in (1), wherein a construction in which pilot signals that are known on the receiving side and that are used to estimate information relating to the propagation path fluctuation values or the like for each sub-carrier are transmitted separately from the information signals in order to control the weighting used in MMSE combining by utilizing information such as the estimated values of the propagation path fluctuation or the like.

(3) The multi-channel CDMA transmission method described in (1), wherein a construction in which the number of multiplexed information channels is sent from the transmitting side to the receiving side separately from the information signals in order to control the weighting used in MMSE combining by utilizing information such as the estimated values of the propagation path fluctuation or the like.

(4) The multi-channel CDMA transmission method described in (1), wherein a construction in which pilot signals used as reference signals are transmitted separately from the information signals in order to perform successive updating of the weighting used in MMSE combining by means of an adaptive algorithm.

(5) The multi-channel CDMA transmission method described in (1), wherein a construction in which the signals described in (2), (3) and (4) are simultaneously transmitted separately from the information signals in order to control the weighting used in MMSE combining.

(6) The multi-channel CDMA transmission method described in (1), wherein a receiving part construction is used in which the propagation path fluctuation values, noise power and number of multiplexed information channels are estimated using information signals and pilot signals used to estimate information relating to the propagation path fluctuation values or the like, and the weighting used for MMSE combining is calculated using these estimated values.

(7) The multi-channel CDMA transmission method described in (1), wherein a receiving part construction is used in which the propagation path fluctuation values and noise power are estimated using the information signals and pilot signals used to estimate information relating to the propagation path fluctuation values or the like described in (2), the number of information channels is estimated using the signals used to ascertain the number of multiplexed information channels described in (3), and the weighting for MMSE combining is calculated using these estimated values.

(8) The multi-channel CDMA transmission method described in (1), wherein a receiving part construction is used in which the weighting of MMSE combining is successively updated by means of an adaptive algorithm utilizing the pilot signals used for successive updating of the weighting used in MMSE combining described in (4), so that the mean square error between the signals following despreading and the signals that are actually transmitted is minimized.

(9) The multi-channel CDMA transmission method described in (1), wherein a receiving part construction is used in which the weighting of MMSE combining is successively updated by means of an adaptive algorithm utilizing the pilot signals used for successive updating of the weighting used in MMSE combining described in (4), so that the mean square error between the signals prior to the reception FFT treatment and the signals that are actually transmitted is minimized.

(10) The multi-channel CDMA transmission method described in (5), wherein a receiving part construction is used in which the initial values of the weighting for MMSE combining are determined propagation path fluctuation values or the like estimated from pilot signals used to estimate propagation path fluctuation values or the like, and the weighting is successively updated by means of an adaptive algorithm on the basis of pilot signals used for successive updating of the weighting.

(11) The multi-carrier CDMA transmission method with a receiving part construction in which the weighting for MMSE combining is successively updated by means of an adaptive algorithm as described in (8) and (10), wherein a receiving part construction is used in which the weighting for MMSE combining is successively updated using pilot signals in which the amount of fluctuation is averaged in the direction of the frequency axis.

(12) The multi-carrier CDMA transmission method with a receiving part construction in which the weighting for MMSE combining is successively updated by means of an adaptive algorithm as described in (8), (10) and (11), wherein a receiving part construction is used in which the weighting for MMSE combining is successively updated using pilot signals in which the amount of fluctuation is averaged in the direction of the frequency axis.

Figure 22:
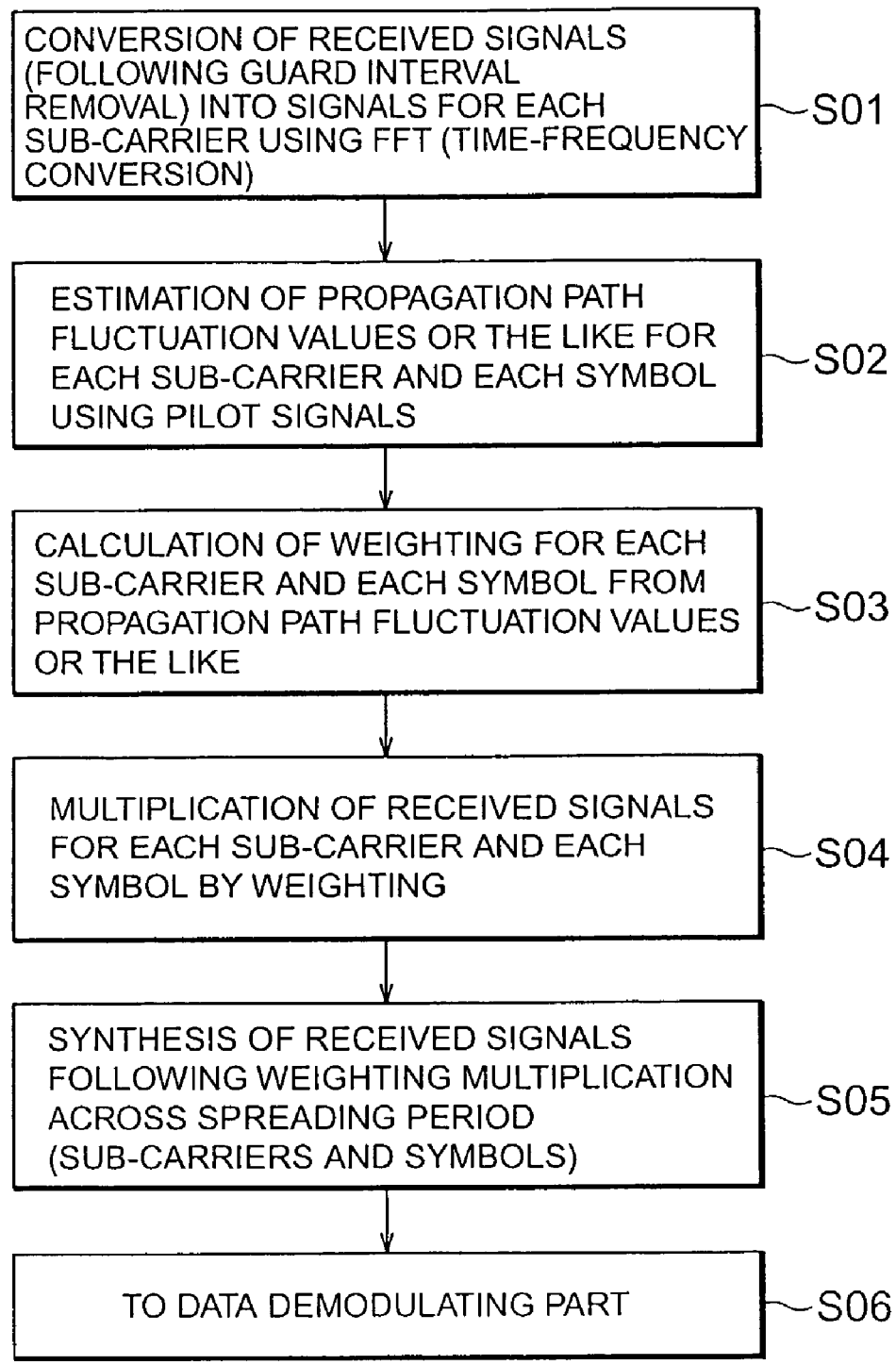
FIG. 22 is a diagram which shows a multi-channel CDMA transmission method according to an embodiment of the present invention.
Figure 23:
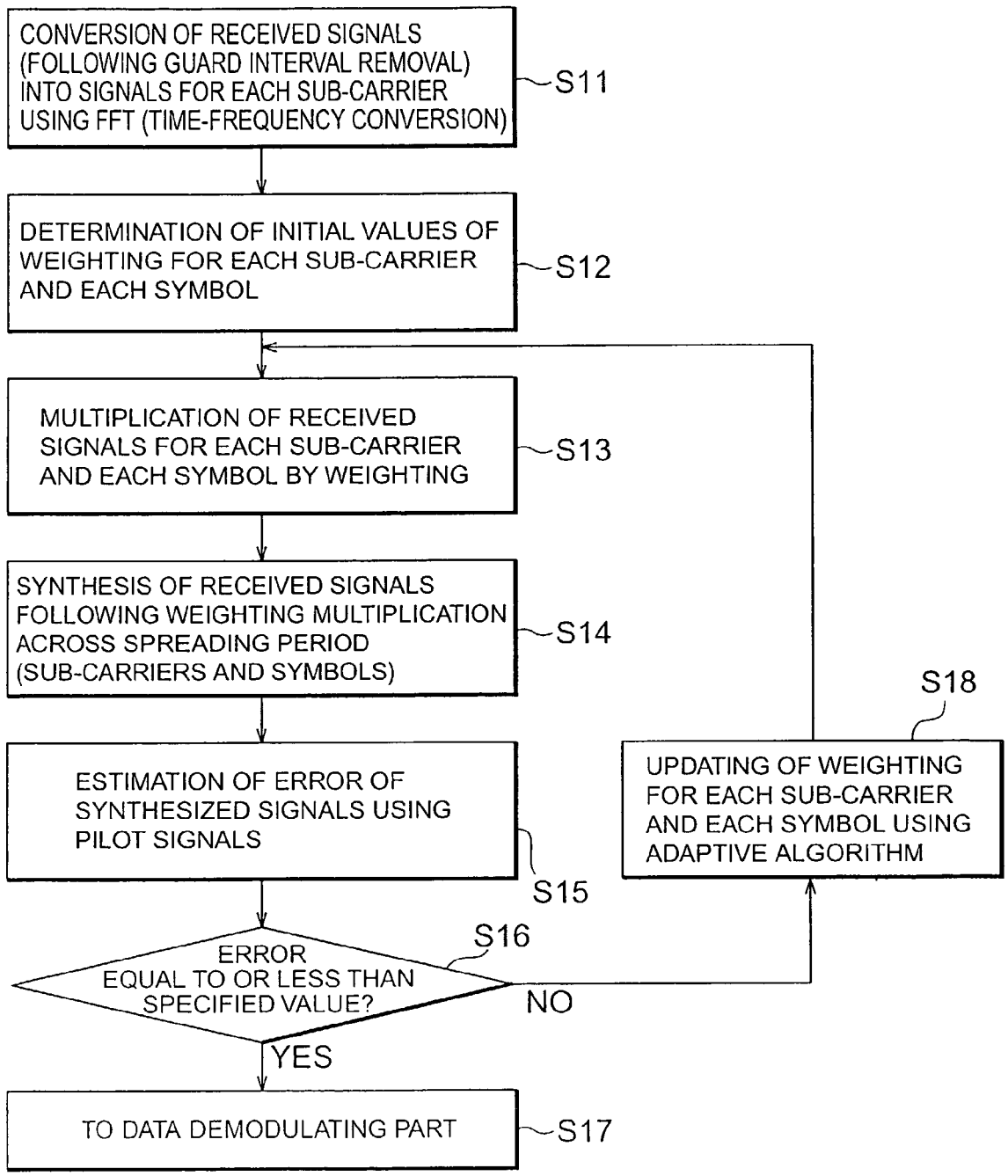
FIG. 23 is a diagram which shows a multi-channel CDMA transmission method according to an embodiment of the present invention.
Figure 24:
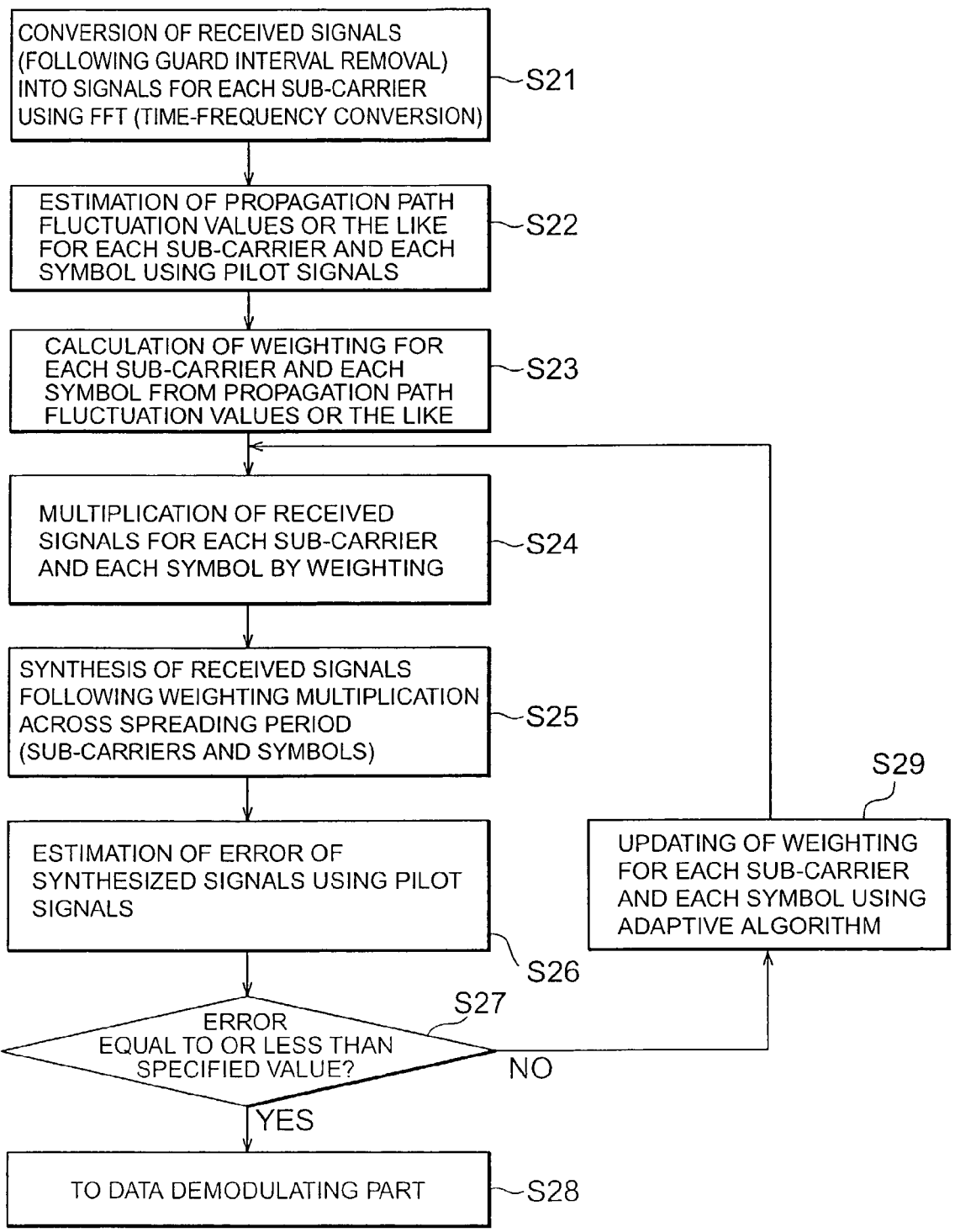
FIG. 24 is a diagram which shows a multi-channel CDMA transmission method according to an embodiment of the present invention.

In more concrete terms, the multi-channel CDMA transmission methods shown in FIGS. 22 through 24 are used. In the following description, FIG. 2 will be referred to for convenience along with FIGS. 22 through 24. In the multi-channel CDMA transmission method shown in FIG. 22, the received signals following guard interval removal are converted into signals for each sub-carrier using the time-frequency conversion part (FFT) 2-3 (step S01). The part 2-6 that estimates propagation path fluctuation values or the like estimates propagation path fluctuation values or the like for each sub-carrier and each symbol by means of pilot signals (step S02).

The part 2-8 that controls the weighting for each sub-carrier calculates the weighting for each sub-carrier and each symbol from the estimated propagation path fluctuation values or the like (step S03). The received signals are multiplied by this weighting for each sub-carrier and each symbol (step S04).

The symbol combining parts 2-10 synthesize the received signals following weighting multiplication across the spreading period (sub-carriers and symbols) (step S05). The synthesized received signals are sent to the data demodulating part and demodulated (step S06).

In the multi-channel CDMA transmission method shown in FIG. 23, the received signals following guard interval removal are converted into signals for each sub-carrier using the time-frequency conversion part (FFT) 2-3 (step S11). The part 2-6 that estimates propagation path fluctuation values or the like estimates propagation path fluctuation values or the like for each sub-carrier and each symbol, and the part 2-8 that controls the weighting for each sub-carrier determines the initial values of the weighting for each sub-carrier and each symbol (step S12).

The received signals are multiplied by this weighting for each sub-carrier and each symbol (step S13). The symbol combining parts 2-10 synthesize the received signals following weighting multiplication across the spreading period (sub-carriers and symbols) (step S14).

The error estimating part estimates the error of the synthesized signals by means of pilot signals (step S15). The error estimating part 2-7 makes a judgement as to whether or not the error is equal to or less than a specified value (step S16). In cases where the error is not equal to or less than this specified value, the error estimating part 2-7 updates the weighting for each sub-carrier and each symbol by means of an adaptive algorithm (step S18). In cases where the error is equal to or less than the abovementioned specified value, the synthesized received signals are sent to the data demodulating part and demodulated (step S17).

In the multi-channel CDMA transmission method shown in FIG. 24, the received signals following guard interval removal are converted into signals for each sub-carrier using the time-frequency conversion part (FFT) 2-3 (step 21). The part 2-6 that estimates propagation path fluctuation values or the like estimates propagation path fluctuation values or the like for each sub-carrier and each symbol by means of pilot signals (step S22).

The part 2-8 that controls the weighting for each sub-carrier calculates the weighting for each sub-carrier and each symbol from the estimated propagation path fluctuation values or the like (step S23). The received signals are multiplied by this weighting for each sub-carrier and each symbol (step S24).

The symbol combining parts 2-10 synthesize the received signals following weighting multiplication across the spreading period (sub-carriers and symbols) (step S25). The error estimating part 2-7 estimates the error of the synthesized signals by means of pilot signals (step S26). The error estimating part 2-7 then makes a judgement as to whether or not the error is equal to or less than a specified value (step S27).

In cases where the error is not equal to or less than this specified value, the error estimating part 2-7 updates the weighting for each sub-carrier and each symbol by means of an adaptive algorithm (step S29). In cases where the error is equal to or less than the abovementioned specified value, the synthesized received signals are sent to the data demodulating part and demodulated (step S28).

In the abovementioned embodiment, the propagation path fluctuation is estimated and weighting is performed for a certain instant. However, it would also be possible to perform combining for information symbols copied in two-dimensional form on the frequency axis and time axis using duplicating means (i. e., a copier). If weighting is thus performed using a plurality of frequencies and times, then received signals that have a higher precision with respect to fluctuations in the time direction, i. e., fading fluctuations, can be obtained.

In cases where combining is performed by estimating propagation path fluctuations for information symbols copied in two-dimensional form on the frequency axis and time axis by duplicating means (a copier), processing in the sub-carrier direction (frequency axis) and OFCDM symbol direction (time axis) is added (for the estimation of propagation path fluctuation values or the like, calculation of weighting (including updating), multiplication of weighting and combining of received signals) to the flow shown in FIGS. 22 through 24 as the multi-channel CDMA transmission method.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies,
   wherein there are provided on a receiving side:
   weighting control means for controlling weighting of each sub-carrier so that signals following despreading approach the signals that are actually transmitted; and
   combining means for performing combining by multiplying received signals of the respective sub-carriers by the weighting for each sub-carrier controlled by said weighting control means.

2. A multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies,
   wherein there are provided on a receiving side:
   effect estimating means for estimating effects of the propagation path fluctuations to which signals that are actually transmitted are subjected while these signals travel to the receiving side from the transmitting side;
   weighting control means for controlling weighting of each sub-carrier on the basis of the effects of the propagation path fluctuations estimated by said effect estimating means so that the signals following despreading approach the signals that are actually transmitted; and
   combining means for performing combining by multiplying received signals of the respective sub-carriers by the weighting for each sub-carrier controlled by said weighting control means, are disposed on the receiving side.

3. A multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies,
   wherein there are provided on a receiving side:
   effect estimating means for estimating effects of the propagation path fluctuations to which signals that are actually transmitted are subjected while these signals travel to the receiving side from the transmitting side;
   error estimating means for estimating error between the signals that are actually transmitted and the signals following despreading on the basis of signals used for the estimation of this error;
   weighting control means for controlling weighting of each sub-carrier on the basis of the effects of the propagation path fluctuations estimated by said effect estimating means and the error estimated by said error estimating means so that the signals following despreading approach the signals that are actually transmitted; and
   combining means for performing combining by multiplying the received signals of the respective sub-carriers by the weighting for each sub-carrier controlled by said weighting control means, are disposed on the receiving side.

4. A multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies,
   wherein there are provided on a receiving side:
   error estimating means for estimating error between signals that are actually transmitted and signals following despreading on the basis of signals used for the estimation of this error;
   weighting control means for controlling weighting of each sub-carrier on the basis of the error estimated by said error estimating means so that the signals following despreading approach the signals that are actually transmitted; and
   combining means for performing combining by multiplying received signals of the respective sub-carriers by the weighting for each sub-carrier controlled by said weighting control means, are disposed on the receiving side.

5. The multi-carrier CDMA transmission system according to claim 2 or claim 3, wherein said effect estimating means estimate the effects of propagation path fluctuations using at least either pilot signals that are used to estimate propagation path information for each sub-carrier, or information relating to the number of multiplexed information channels.

6. The multi-carrier CDMA transmission system according to claim 2 or claim 3, wherein said effect estimating means estimate the propagation path fluctuation values, noise power and number of multiplexed channels as effects of propagation path fluctuations utilizing the signals following despreading and pilot signals used to estimate propagation path information for each sub-carrier.

7. The multi-carrier CDMA transmission system according to claim 2 or claim 3, wherein said effect estimating means estimate the propagation path fluctuation values and noise power as effects of propagation path fluctuations, with this estimation being performed utilizing the signals following despreading and pilot signals that are used to estimate propagation path information for each sub-carrier, and said effect estimating means estimate the number of multiplexed information channels as an effect of propagation path fluctuations, with this estimation being performed utilizing information relating to the number of multiplexed information channels.

8. The multi-carrier CDMA transmission system according to claim 3 or claim 4, wherein said error estimating means estimate the error using at least one type of signal selected from pilot signals used for the successive updating of the weighting, pilot signals utilized as reference signals, pilot signals in which amount of fluctuation is averaged in the direction of the frequency axis, and pilot signals in which amount of fluctuation is averaged in the direction of the time axis, as signals for estimating the error relative to the signals following despreading.

9. The multi-carrier CDMA transmission system according to claim 3 or claim 4, wherein said weight control means successively update the weighting for each sub-carrier by means of an adaptive algorithm so that the signals following despreading approach the signals that are actually transmitted.

10. The multi-carrier CDMA transmission system according to claim 3 or claim 4, wherein said weighting control means successively update the weighting for each sub-carrier by means of an adaptive algorithm so that the signals prior to the reception FFT treatment approach the signals that are actually transmitted.

11. The multi-carrier CDMA transmission system according to claim 3, wherein said weighting control means determine the initial values of the weighting for each sub-carrier on the basis of the effects of the propagation path fluctuations estimated by said effect estimating means, and said weighting control means successively update the weighting for each sub-carrier by means of an adaptive algorithm on the basis of the error estimated by said error estimating means.

12. The multi-carrier CDMA transmission system according to claim 1, wherein weighting information transmitting means are disposed on the transmitting side for transmitting, separately from said signals that are actually transmitted, at least one type of signal selected from pilot signals used to estimate propagation path information for each sub-carrier, information relating to the number of multiplexed information channels, pilot signals utilized as reference signals, pilot signals used for the successive updating of the weighting, pilot signals used on the receiving side for averaging amount of fluctuation in the direction of the frequency axis, and pilot signals used on the receiving side for averaging the amount of fluctuation in the direction of the time axis.

13. A transmitting apparatus in a multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this transmitting apparatus comprises weighting information transmitting means for transmitting, separately from signals that are actually transmitted, at least one type of signal selected from a number of different types of pilot signals including pilot signals used to estimate propagation path information for each sub-carrier, information relating to a number of multiplexed information channels, pilot signals utilized as reference signals, pilot signals used for the successive updating of weighting, pilot signals used on a receiving side for averaging amount of fluctuation in the direction of the frequency axis, and pilot signals used on the receiving side for averaging amount of fluctuation in the direction of the time axis.

14. A receiving apparatus in a multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this receiving apparatus comprises:
weighting control means for controlling the weighting for each sub-carrier so that signals following despreading approach the signals that are actually transmitted; and
combining means for performing combining by multiplying received signals for each sub-carrier by the weighting for each sub-carrier controlled by said weighting control means.

15. A receiving apparatus in a multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this receiving apparatus comprises:
effect estimating means for estimating effects of the propagation path fluctuations to which signals that are actually transmitted are subjected while these signals travel to the receiving side from the transmitting side;
weighting control means for controlling weighting of each sub-carrier on the basis of the effects of the propagation path fluctuations estimated by said effect estimating means so that signals following despreading approach the signals that are actually transmitted; and
combining means for performing combining by multiplying received signals of the respective sub-carriers by the weighting for each sub-carrier controlled by said weighting control means.

16. A receiving apparatus in a multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this receiving apparatus comprises:
effect estimating means for estimating effects of the propagation path fluctuations to which signals that are actually transmitted are subjected while these signals travel to the receiving side from the transmitting side;
error estimating means for estimating error between the signals that are actually transmitted and the signals following despreading on the basis of signals used for the estimation of this error;

weighting control means for controlling weighting of each sub-carrier on the basis of the effects of the propagation path fluctuations estimated by said effect estimating means and the error estimated by said error estimating means so that signals following despreading approach the signals that are actually transmitted; and combining means for performing combining by multiplying received signals of the respective sub-carriers by the weighting for each sub-carrier controlled by said weighting control means.

17. A receiving apparatus in a multi-carrier CDMA transmission system in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this receiving apparatus includes error estimating means for estimating error between signals that are actually transmitted and signals following despreading on the basis of signals used for the estimation of this error;

weighting control means for controlling weighting of each sub-carrier on the basis of the error estimated by said error estimating means so that the signals following despreading approach the signals that are actually transmitted; and combining means for performing combining by multiplying received signals of the respective sub-carriers by the weighting for each sub-carrier controlled by said weighting control means.

18. The receiving apparatus according to claim 15 or claim 16, wherein said effect estimating means estimate the effects of propagation path fluctuations using at least either pilot signals that are used to estimate propagation path information for each sub-carrier, or information relating to the number of multiplexed information channels.

19. The receiving apparatus according to claim 15 or claim 16, wherein said effect estimating means estimate the propagation path fluctuation values, noise power and number of multiplexed channels as the effects of propagation path fluctuations utilizing the signals following despreading and pilot signals that are used to estimate propagation path information for each sub-carrier.

20. The receiving apparatus according to claim 15 or claim 16, wherein said effect estimating means estimate the propagation path fluctuation values and noise power as effects of propagation path fluctuations, with this estimation being performed utilizing the signals following despreading and pilot signals used to estimate propagation path information for each sub-carrier, and the effect estimating means estimate the number of multiplexed information channels as an effect of propagation path fluctuations, with this estimation being performed utilizing information relating to the number of multiplexed information channels.

21. The receiving apparatus according to claim 16 or claim 17, wherein said error estimating means estimate the error using at least one type of signal selected from pilot signals used for the successive updating of the weighting, pilot signals utilized as reference signals, pilot signals in which amount of fluctuation is averaged in the direction of the frequency axis, and pilot signals in which amount of fluctuation is averaged in the direction of the time axis, as signals for estimating the error relative to the signals following despreading.

22. The receiving apparatus according to claim 16 or claim 17, wherein said weighting control means successively update the weighting for each sub-carrier by means of an adaptive algorithm so that the signals following despreading approach the signals that are actually transmitted.

23. The receiving apparatus according to claim 16 or claim 17, wherein said weighting control means successively update the weighting for each sub-carrier by means of an adaptive algorithm so that the signals prior to the reception FFT treatment approach the signals that are actually transmitted.

24. The receiving apparatus according to claim 16, wherein said weighting control means determine the initial values of the weighting for each sub-carrier on the basis of the effects of the propagation path fluctuations estimated by said effect estimating means, and said weighting control means successively update the weighting for each sub-carrier by means of an adaptive algorithm on the basis of the error estimated by said error estimating means.

25. A multi-channel CDMA transmission method in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this method comprises:

a step in which weighting control means on a receiving side control weighting for each sub-carrier so that signals following despreading approach signals that are actually transmitted; and a step in which combining means on the receiving side perform combining by multiplying received signals of each sub-carrier by the weighting for each sub-carrier controlled by said weighting control means.

26. A multi-channel CDMA transmission method in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this method comprises:

a step in which effect estimating means on a receiving side estimate effects of the propagation path fluctuations to which the signals that are actually transmitted are subjected while these signals travel to the receiving side from the transmitting side;

a step in which weighting control means on the receiving side control weighting for each sub-carrier on the basis of the effects of the propagation path fluctuations estimated by said effect estimating means so that signals following dispreading approach signals that are actually transmitted; and a step in which combining means on the receiving side perform combining by multiplying received signals of each sub-carrier by the weighting for each sub-carrier controlled by said weighting control means.

27. A multi-channel CDMA transmission method in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this method comprises:

a step in which effect estimating means on a receiving side estimate effects of the propagation path fluctuations to which signals that are actually transmitted are subjected while these signals travel to the receiving side from the transmitting side;

a step in which error estimating means on the receiving side estimate error between the signals that are actually transmitted and signals following despreading on the basis of signals used for the estimation of this error;

a step in which weighting control means on the receiving side control weighting for each sub-carrier on the basis of the effects of the propagation path estimated by said effect estimating means and the error estimated by said error estimating means so that the signals following despreading approach the signals that are actually transmitted; and a step in which combining means on the receiving side perform combining by multiplying received signals of each sub-carrier by the weighting for each sub-carrier controlled by the weighting control means.

28. A multi-channel CDMA transmission method in which information symbols are duplicated and lined up in a direction of a frequency axis, these duplicated information symbols are multiplied by a spreading code in the direction of the frequency axis, and the respective information symbols are transmitted by means of a plurality of sub-carriers with different frequencies, wherein this method comprises:

a step in which error estimating means on a receiving side estimate error between signals that are actually transmitted and signals following despreading on the basis of signals used for the estimation of this error;

a step in which weighting control means on the receiving side control weighting for each sub-carrier on the basis of the error estimated by said error estimating means so that the signals following despreading approach the signals that are actually transmitted; and a step in which combining means on the receiving side perform combining by multiplying received signals of each sub-carrier by the weighting for each sub-carrier controlled by said weighting control means.

29. The multi-channel CDMA transmission method according to claim 26 or claim 27, wherein, in the step in which said effects are estimated, said effect estimating means estimate the effects of propagation path fluctuations using at least either pilot signals that are used to estimate propagation path information for each sub-carrier, or information relating to the number of multiplexed information channels.

30. The multi-channel CDMA transmission method according to claim 26 or claim 27, wherein, in the step in which said effects are estimated, said effect estimating means estimate the propagation path fluctuation values, noise power and number of multiplexed channels as effects of propagation path fluctuations utilizing the signals following despreading and pilot signals used to estimate propagation path information for each sub-carrier.

31. The multi-channel CDMA transmission method according to claim 26 or claim 27, wherein, in the step in which said effects are estimated, said effect estimating means estimate the propagation path fluctuation values and noise power as effects of propagation path fluctuations, with this estimation being performed utilizing the signals following despreading and pilot signals that are used to estimate propagation path information for each sub-carrier, and said effect estimating means estimate the number of multiplexed information channels as an effect of propagation path fluctuations, with this estimation being performed utilizing information relating to the number of multiplexed information channels.

32. The multi-channel CDMA transmission method according to claim 27 or claim 28, wherein, in said step in which the error is estimated, said error estimating means estimate the error using at least one type of signal selected from a set consisting of pilot signals used for the successive updating of the weighting, pilot signals utilized as reference signals, pilot signals in which amount of fluctuation is averaged in the direction of the frequency axis, and pilot signals in which amount of fluctuation is averaged in the direction of the time axis, as signals for estimating the error relative to the signals following despreading.

33. The multi-channel CDMA transmission method according to claim 27 or claim 28, wherein, in the step in which the weighting is controlled, said weighting control means successively update the weighting for each sub-carrier by means of an adaptive algorithm so that that the signals following despreading approach the signals that are actually transmitted.

34. The multi-channel CDMA transmission method according to claim 27 or claim 28, wherein, in the step in which the weighting is controlled, said weighting control means successively update the weighting for each sub-carrier by means of an adaptive algorithm so that that the signals prior to the reception FFT treatment approach the signals that are actually transmitted.

35. The multi-channel CDMA transmission method according to claim 28, wherein, in the step in which said weighting is controlled, said weighting control means determine the initial values of the weighting for each sub-carrier on the basis of the effects of the propagation path fluctuations estimated by said effect estimating means, and said weighting control means successively update the weighting for each sub-carrier by means of an adaptive algorithm on the basis of the error estimated by said error estimating means.

36. The multi-channel CDMA transmission method according to claim 25, wherein said method includes a step in which the weighting information transmitting means on the transmitting side transmits, separately from said signals that are actually transmitted, at least one type of signal selected from pilot signals used to estimate propagation path information for each sub-carrier, information relating to the number of multiplexed information channels, pilot signals utilized as reference signals, pilot signals used for the successive updating of the weighting, pilot signals used on the receiving side for averaging amount of fluctuation in the direction of the frequency axis, and pilot signals used on the receiving side for averaging amount of fluctuation in the direction of the time axis.

* * * * *